March 23, 1965     R. L. TAYLOR     3,174,427
PROPORTIONAL SPACE MATRIX PRINTER
Filed Dec. 27, 1961     18 Sheets-Sheet 4
FIG. 4     MODULAR COUNT CYCLE
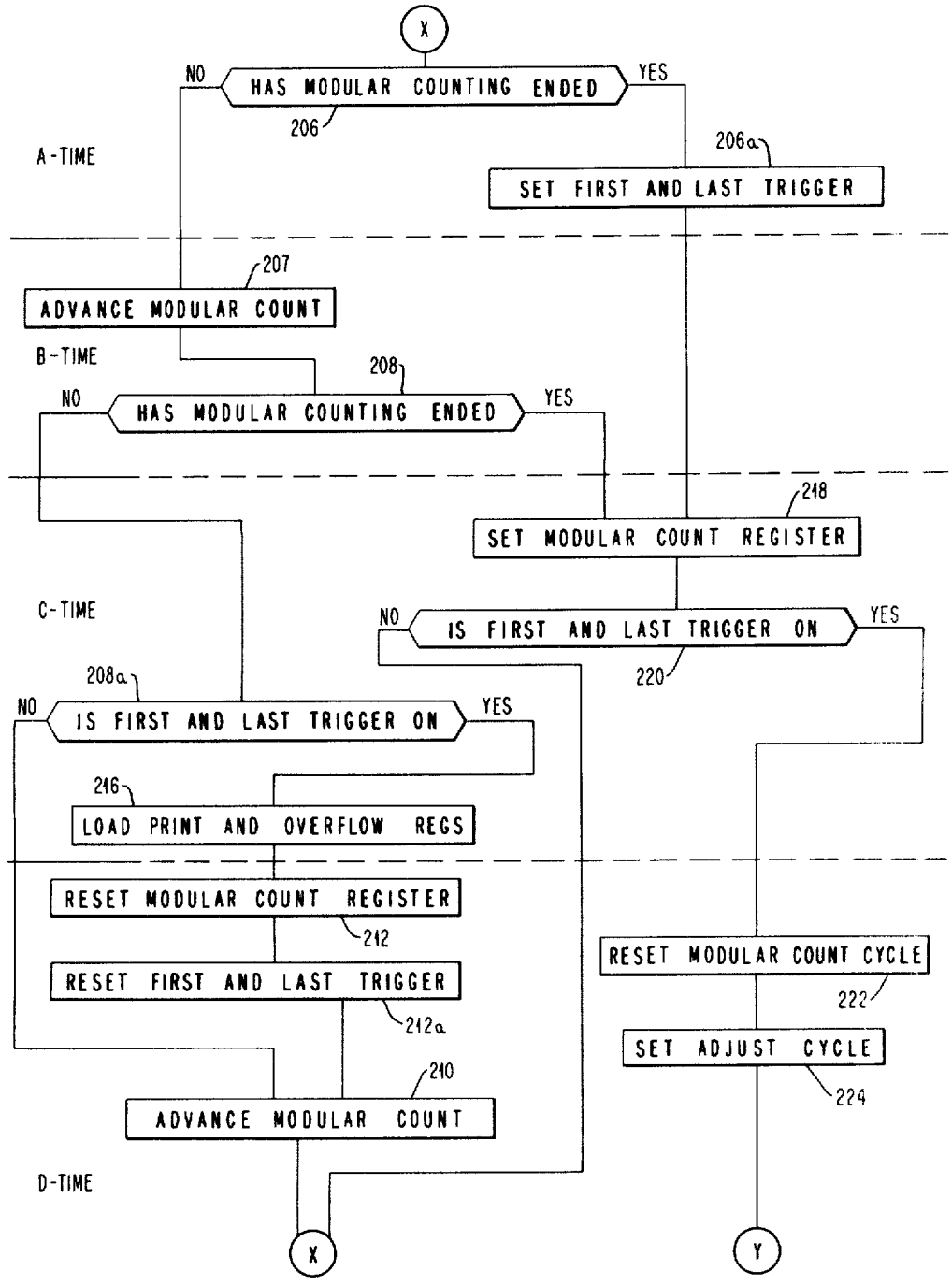

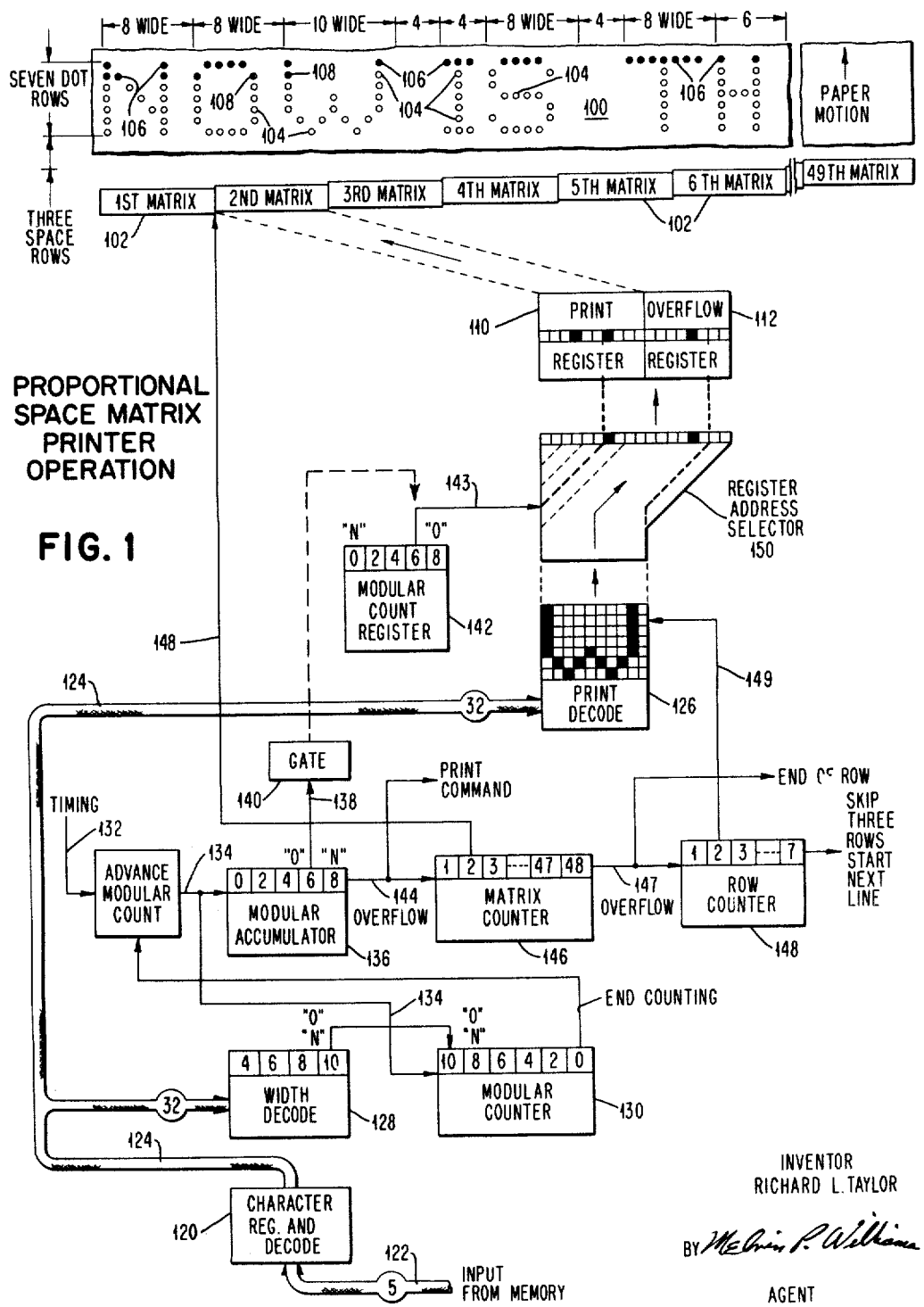

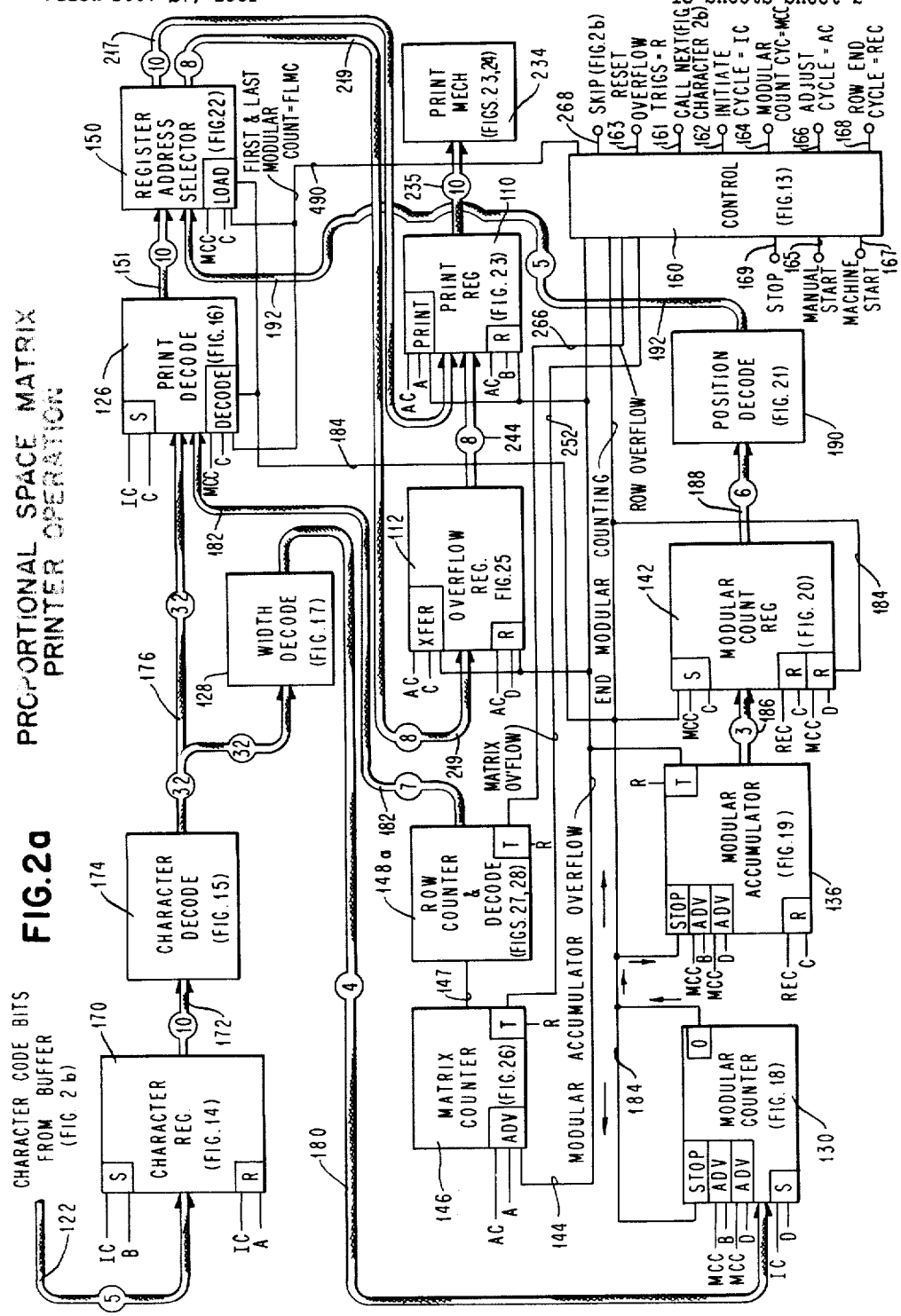

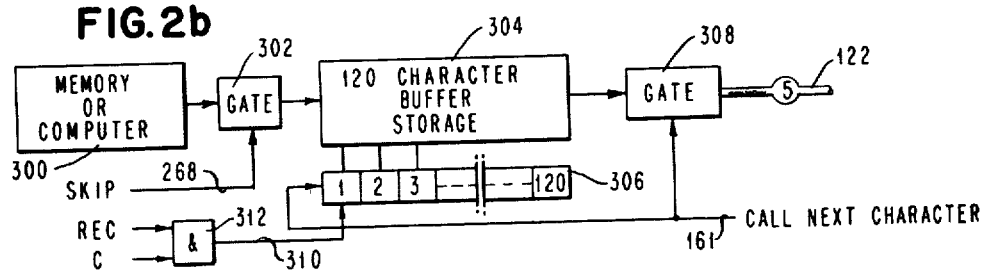
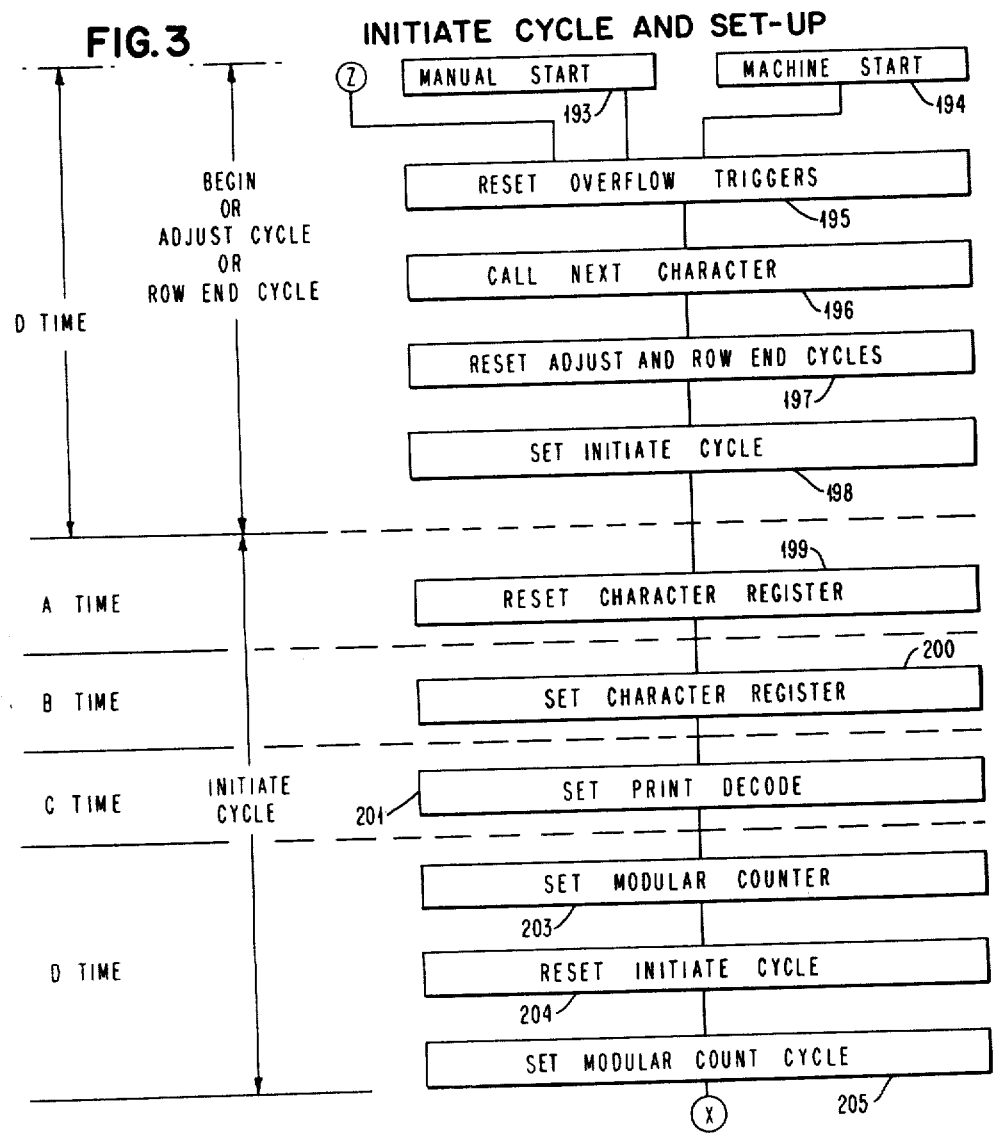

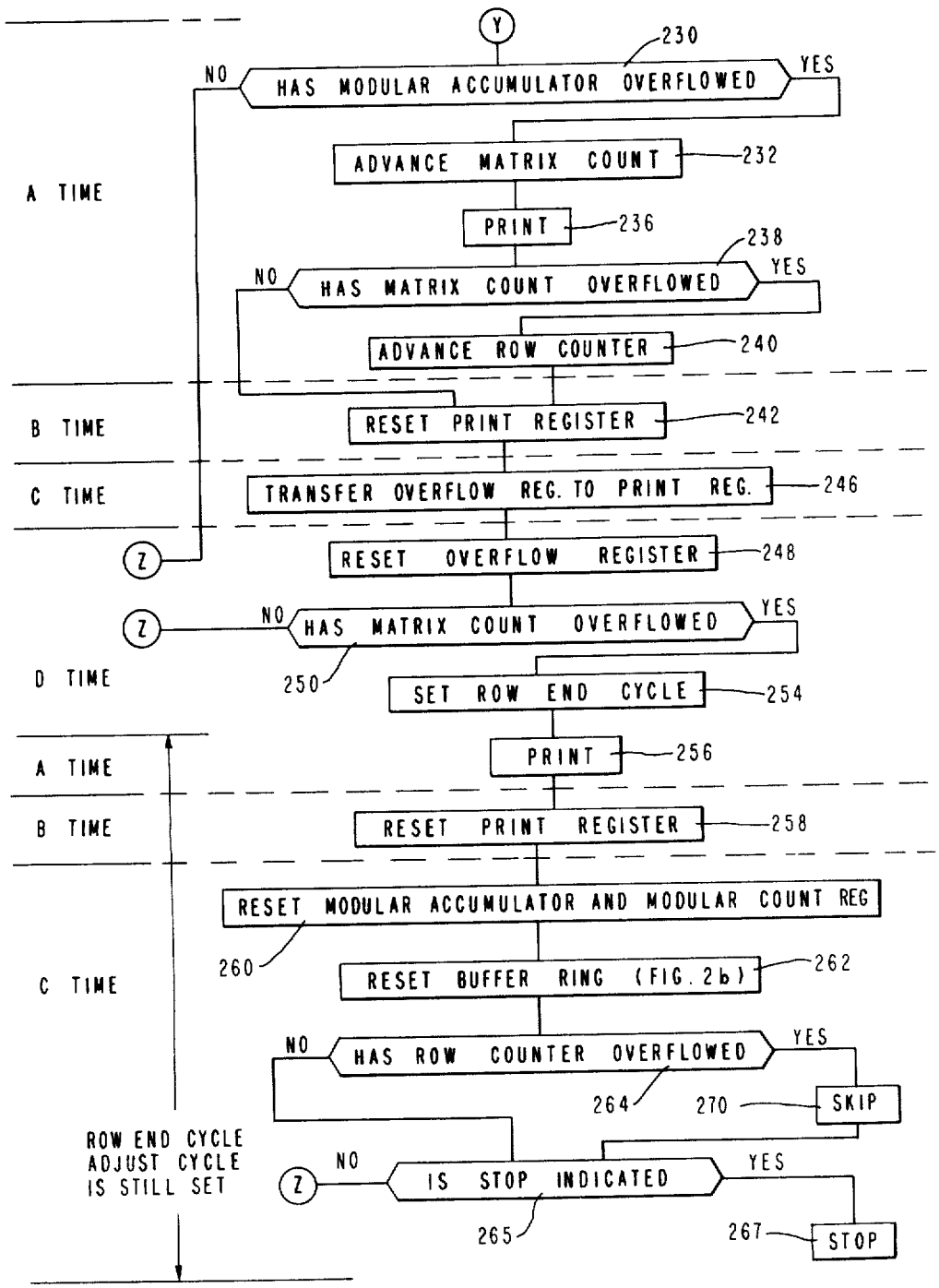

FIG. 17 WIDTH DECODE
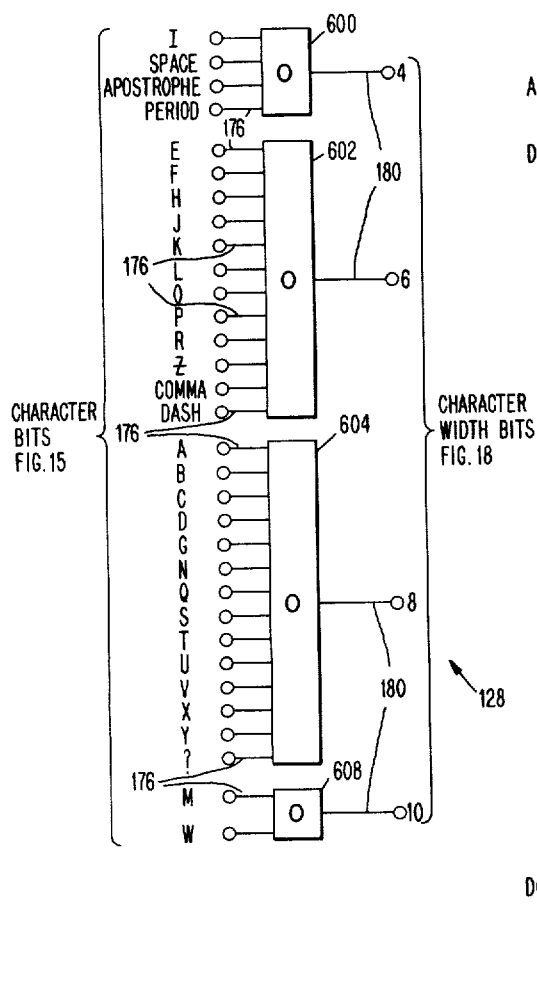
FIG. 6a GATE BLOCK
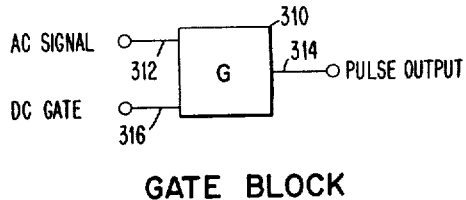
FIG. 7 TRIGGER BLOCK
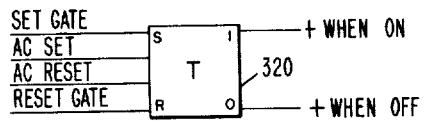
FIG. 6b GATE TIMING
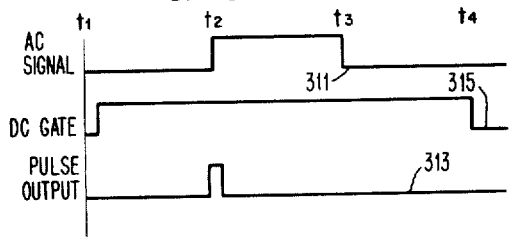
FIG. 8 TRIGGER CIRCUIT
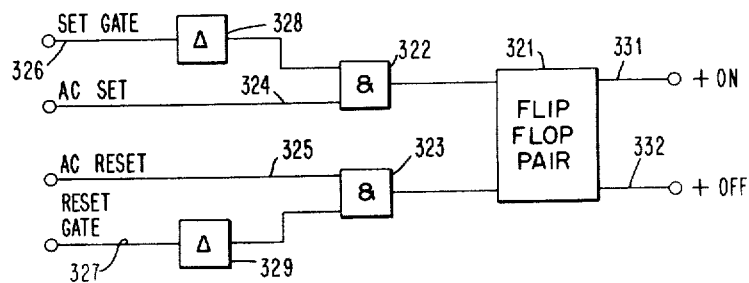

March 23, 1965 R. L. TAYLOR 3,174,427
PROPORTIONAL SPACE MATRIX PRINTER
Filed Dec. 27, 1961 18 Sheets-Sheet 7
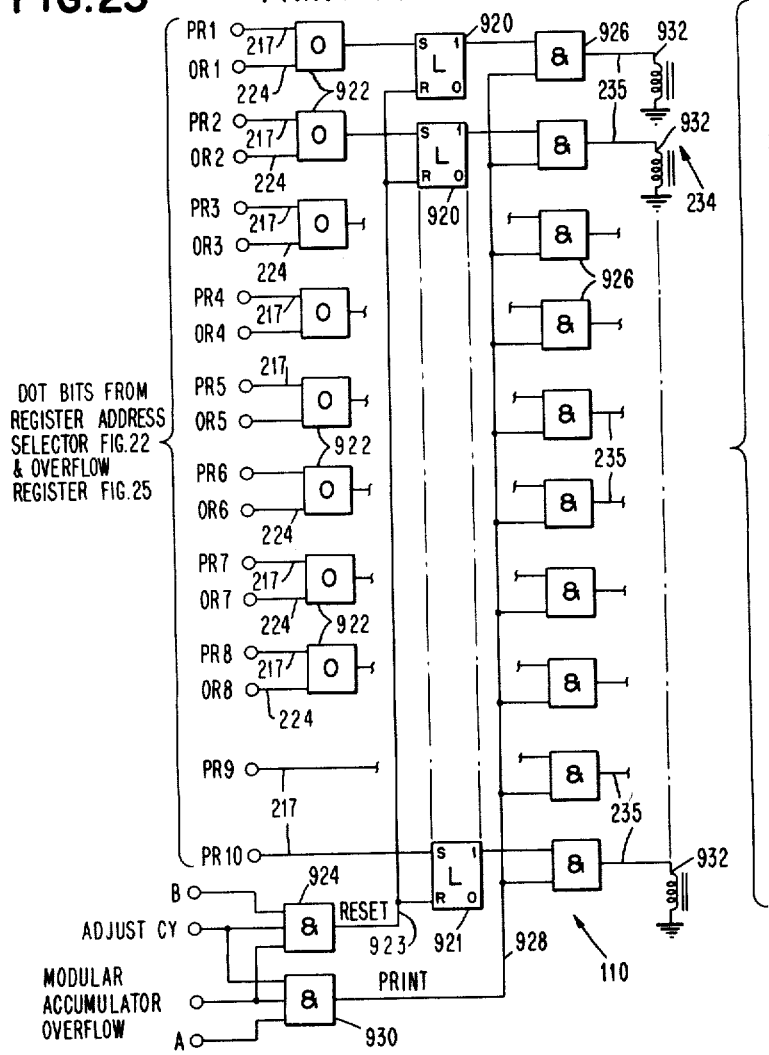
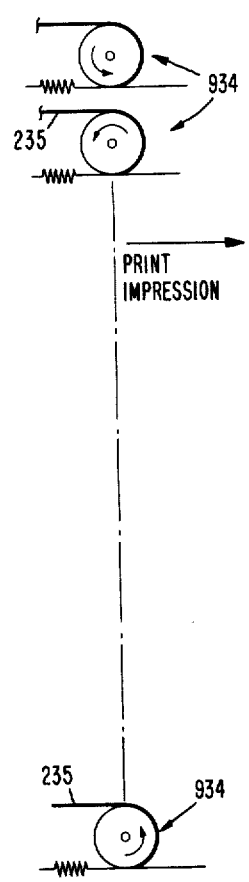
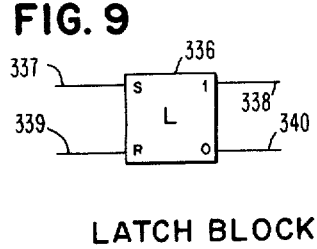
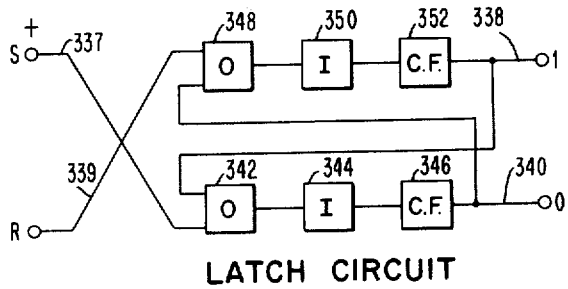

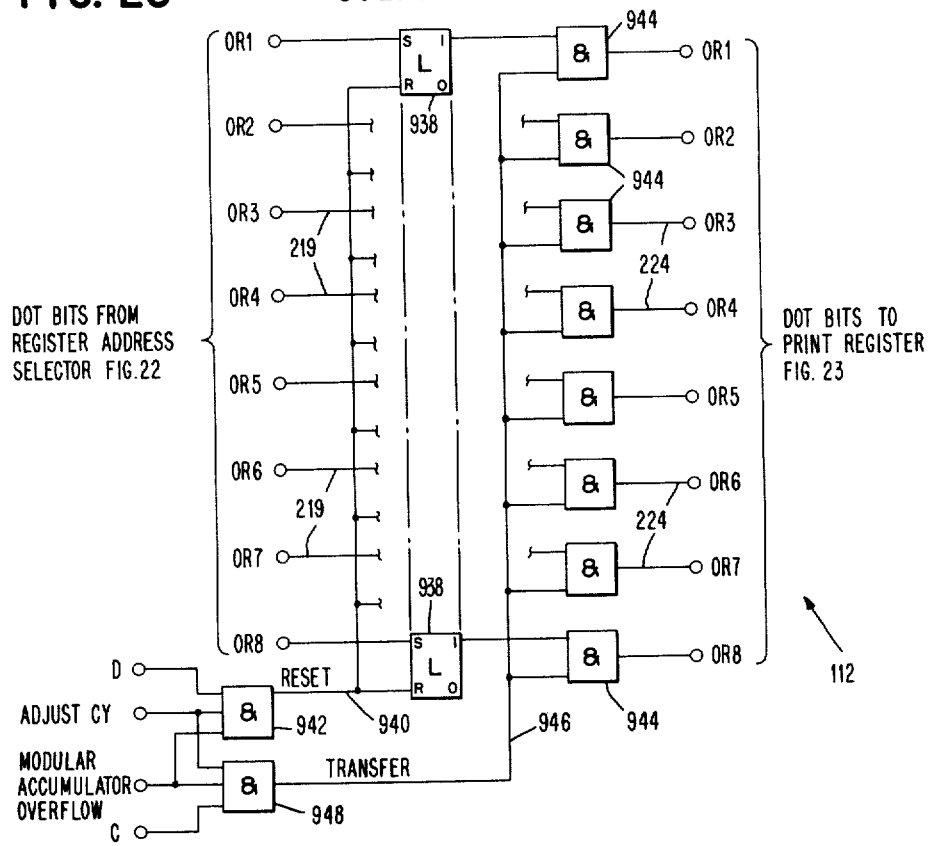
FIG. 25 OVERFLOW REGISTER
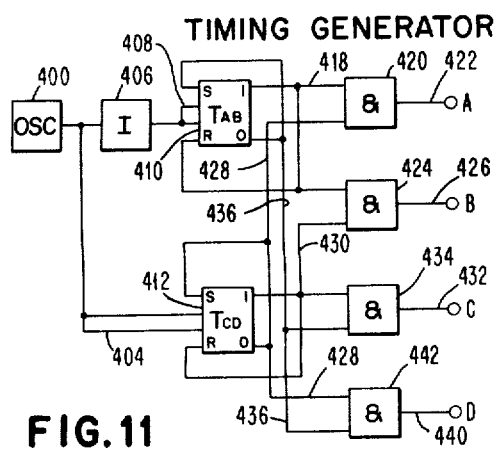
FIG. 11 TIMING GENERATOR
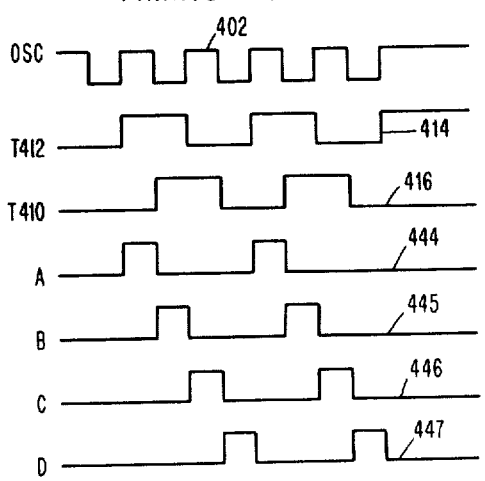
FIG. 12 TIMING PULSES

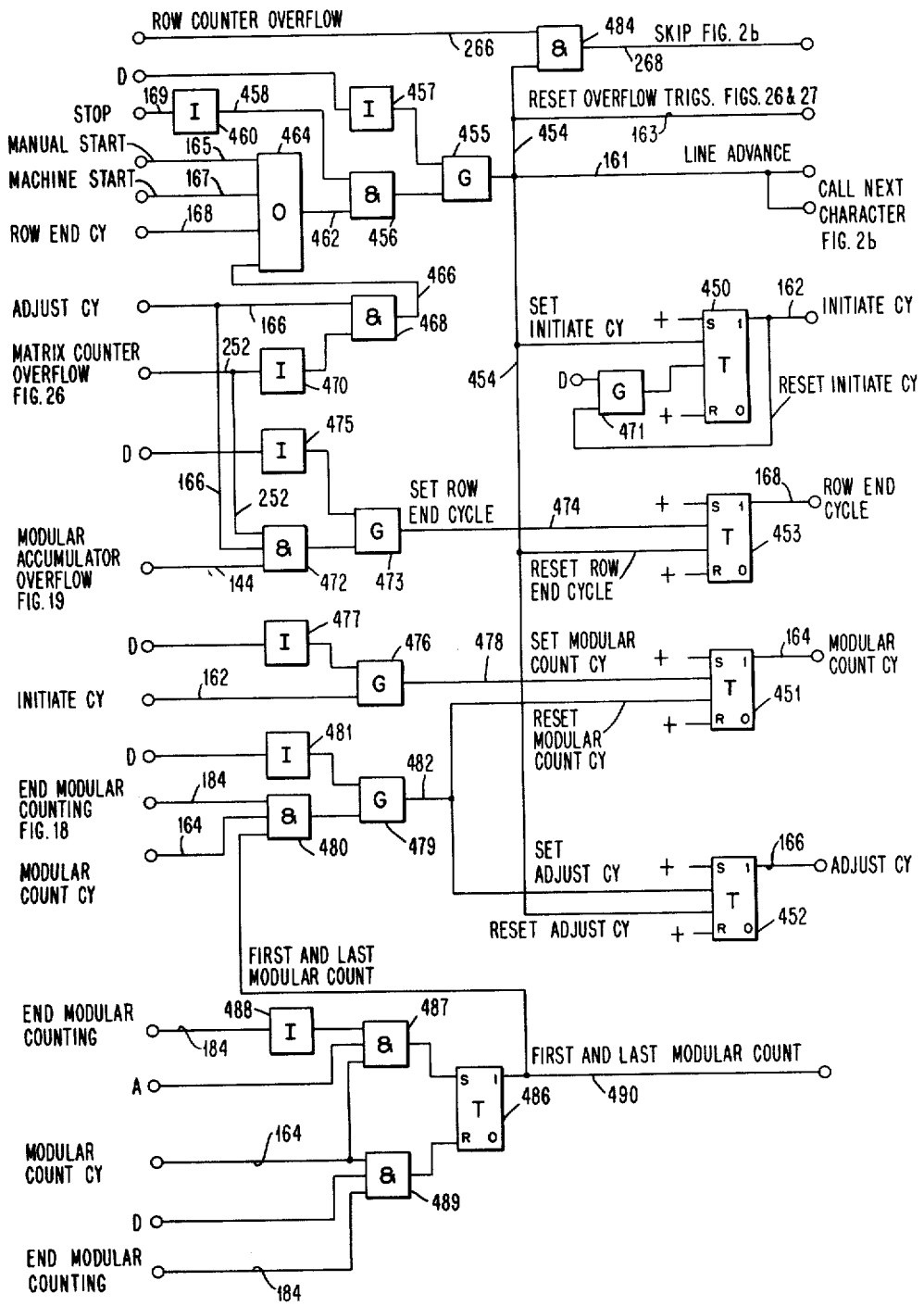

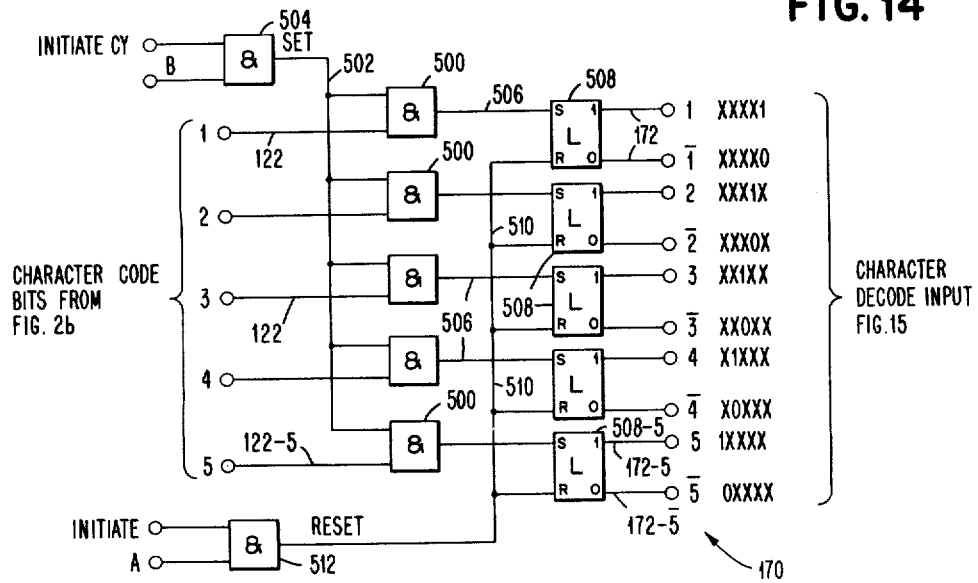
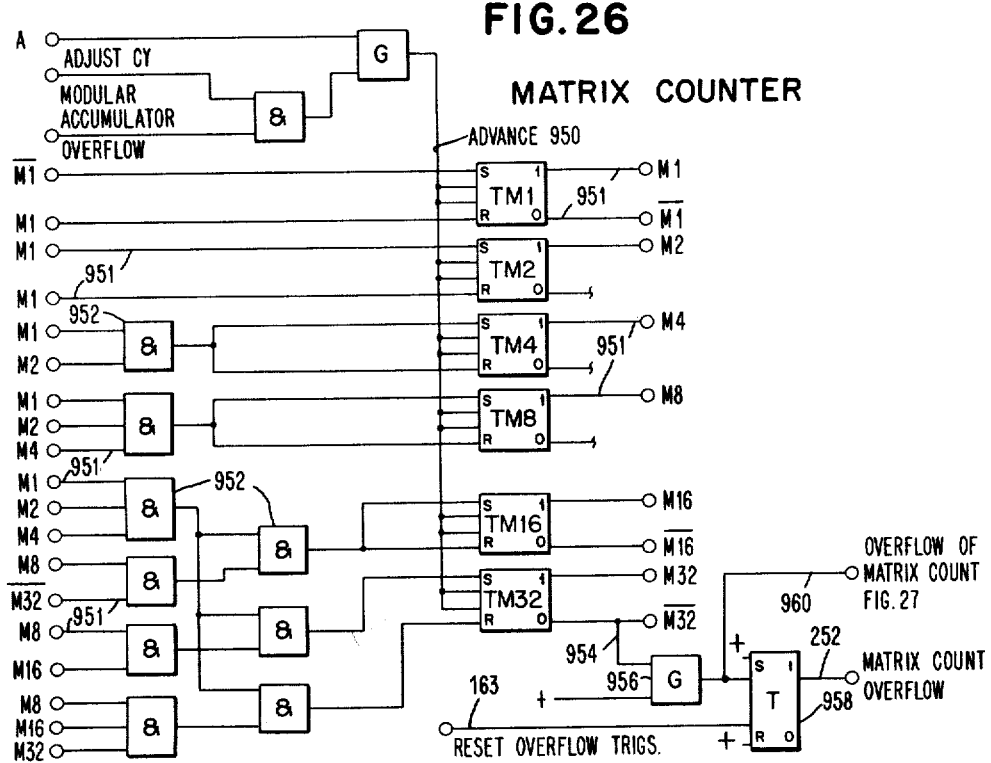

CHARACTER DECODE

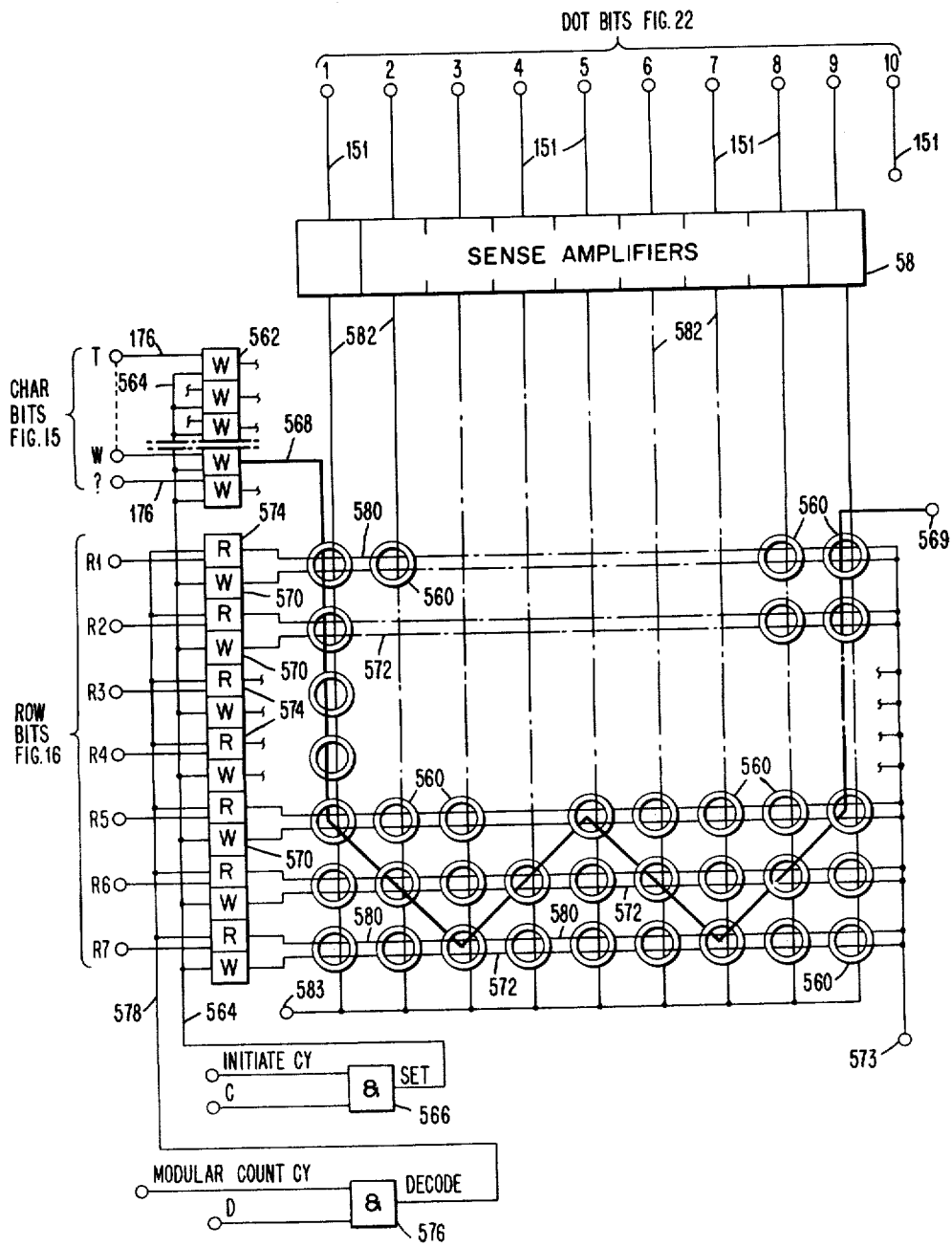

March 23, 1965  R. L. TAYLOR  3,174,427
PROPORTIONAL SPACE MATRIX PRINTER
Filed Dec. 27, 1961  18 Sheets-Sheet 13

FIG. 18  MODULAR COUNTER

| BINARY VALUE | WIDTH VALUE | T612 | T611 | T610 |
|---|---|---|---|---|
| 5 | 10 | 1 | 0 | 1 |
| 4 | 8 | 1 | 0 | 0 |
| 3 | 6 | 0 | 1 | 1 |
| 2 | 4 | 0 | 1 | 0 |
| 1 | 2 | 0 | 0 | 1 |
| 0 | 0 | 0 | 0 | 0 |

FIG. 19 MODULAR ACCUMULATOR

| BINARY VALUE | WIDTH VALUE | T662 | T661 | T660 |
|---|---|---|---|---|
| 0 | 0 | 0 | 0 | 0 |
| 1 | 2 | 0 | 0 | 1 |
| 2 | 4 | 0 | 1 | 0 |
| 3 | 6 | 0 | 1 | 1 |
| 4 | 8 | 1 | 0 | 0 |
| 0 | 0 | 0 | 0 | 0 |

FIG. 20  MODULAR COUNT REGISTER
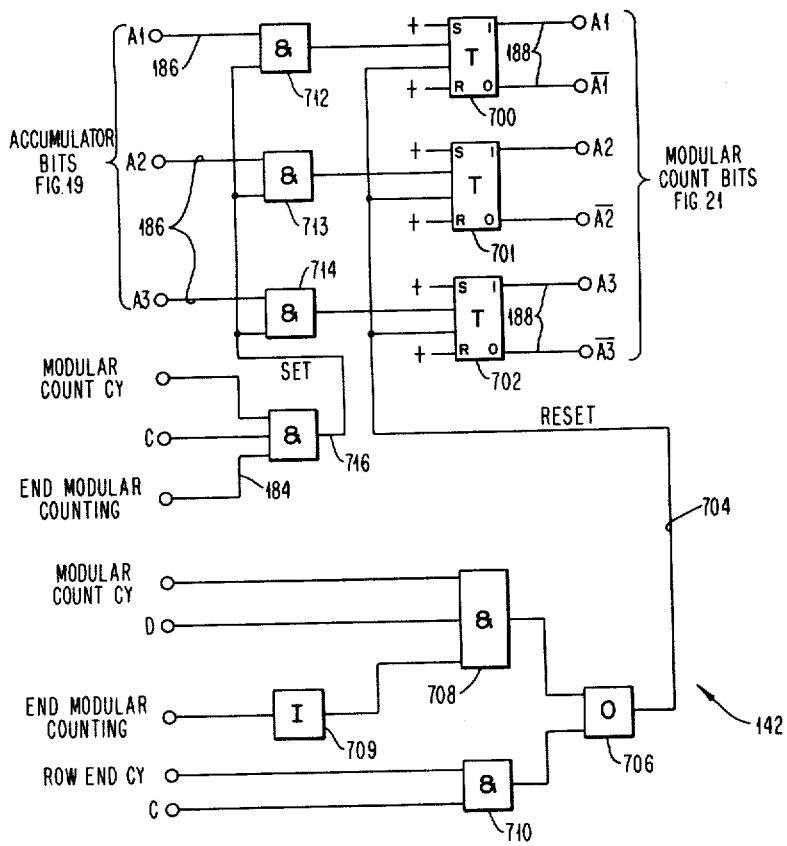
FIG. 21  POSITION DECODE
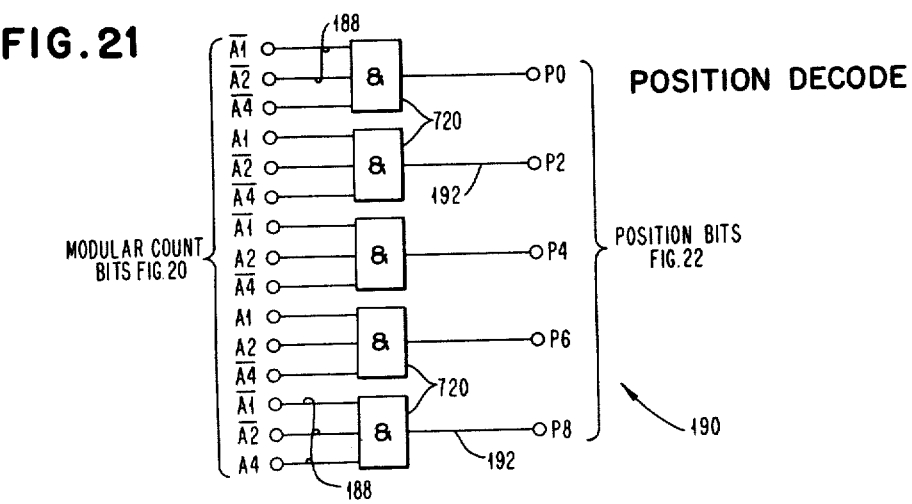

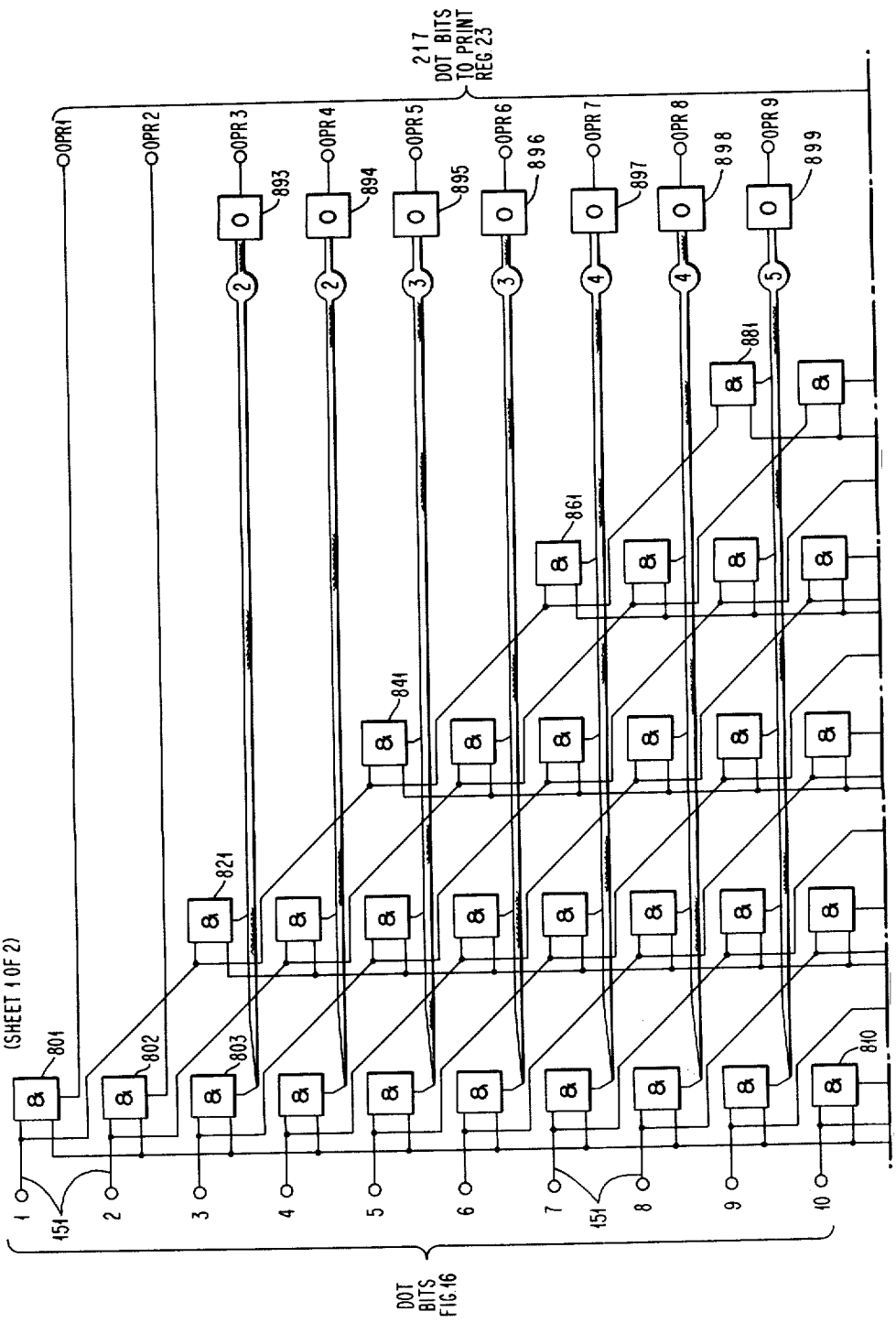

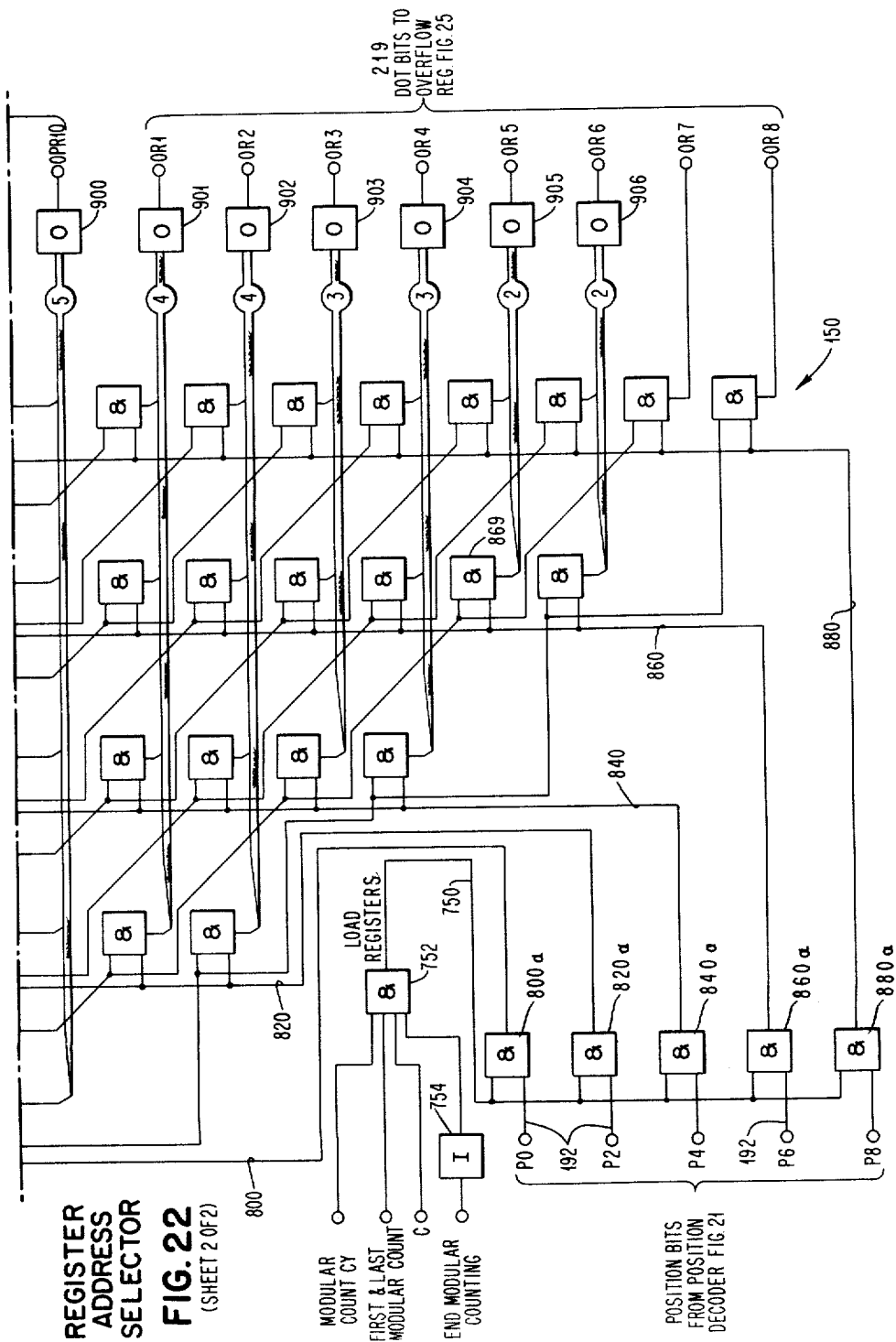

March 23, 1965     R. L. TAYLOR     3,174,427
PROPORTIONAL SPACE MATRIX PRINTER
Filed Dec. 27, 1961     18 Sheets-Sheet 18
FIG. 27
ROW COUNTER
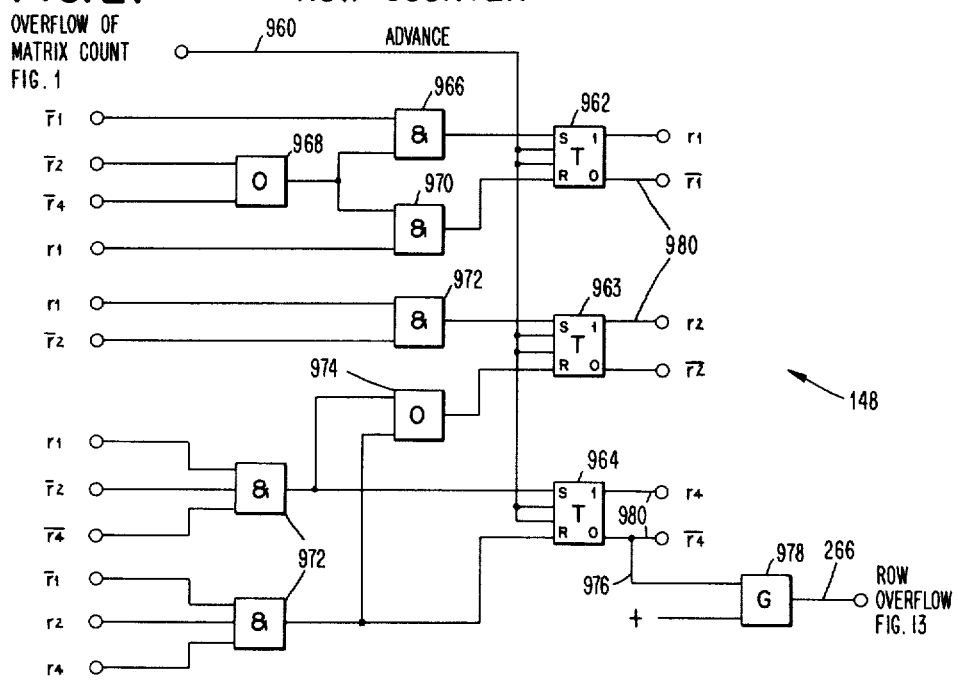
FIG. 28
ROW DECODE
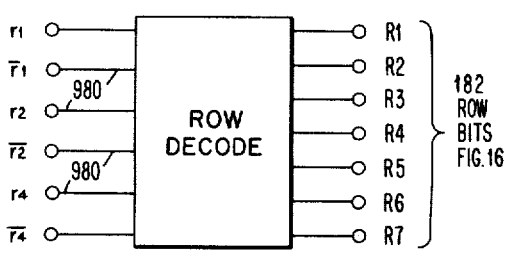
FIG. 29
ROW CODE
| ROW | r4<br>T 964 | r2<br>T 963 | r1<br>T 962 |
|---|---|---|---|
| R1 | 0 | 0 | 0 |
| R2 | 0 | 0 | 1 |
| R3 | 0 | 1 | 0 |
| R4 | 0 | 1 | 1 |
| R5 | 1 | 0 | 0 |
| R6 | 1 | 0 | 1 |
| R7 | 1 | 1 | 0 |
| R1 | 0 | 0 | 0 |

United States Patent Office 3,174,427
Patented Mar. 23, 1965

3,174,427
PROPORTIONAL SPACE MATRIX PRINTER
Richard L. Taylor, Tangleton, Wappingers Falls, N.Y., assignor to International Business Machines Corporation, New York, N.Y., a corporation of New York
Filed Dec. 27, 1961, Ser. No. 162,477
6 Claims. (Cl. 101—93)

This invention relates to proportional space printing and more particularly to electronic apparatus for controlling the printing of data manifestations by a dot or matrix printer in proportionally spaced relationship.

CONTENTS

| Introduction | Column |
|---|---|
| Prior Art | 1 |
| Objects | 1–2 |
| Brief Statement of Invention | 2 |
| Features and Advantages | 2 |
| Description of Drawings | 3–4 |
| Operation in Brief (FIG. 1, Sheet 1) | 4 |
| Block Description (FIGS. 2–5, Sheets 2–5) | 7 |
| Control | 7 |
| Starting | 7 |
| Initiate Cycle | 7 |
| Modular Counting | 8 |
| Adjust Cycle—Printing | 10 |
| Row End—Printing of Last Character | 11 |
| Introduction to Detailed Description (FIGS. 6–10, Sheets 6 and 7) | 12 |
| Detailed Description | 13 |
| Timing Generator (FIGS. 11 and 12, Sheet 8) | 13 |
| CONTROL Circuit (FIG. 13, Sheet 9) | 14 |
| CHARACTER REGISTER (FIG. 14, Sheet 10) | 15 |
| CHARACTER DECODE (FIG. 15, Sheet 11) | 16 |
| PRINT DECODE (FIG. 16, Sheet 12) | 16 |
| WIDTH DECODE (FIG. 17, Sheet 6) | 17 |
| MODULAR COUNTER (FIG. 18, Sheet 13) | 17 |
| MODULAR ACCUMULATOR (FIG. 19, Sheet 14) | 19 |
| MODULAR COUNT REGISTER (FIG. 20, Sheet 15) | 20 |
| POSITION DECODE (FIG. 21, Sheet 15) | 20 |
| REGISTER ADDRESS SELECTOR (FIG. 22, Sheets 16 and 17) | 20 |
| PRINT REGISTER (FIGS. 23, 24, Sheet 7) | 21 |
| OVERFLOW REGISTER (FIG. 25, Sheet 8) | 21 |
| MATRIX COUNTER (FIG. 26, Sheet 10) | 22 |
| ROW COUNTER (FIG. 27, Sheet 18) | 22 |
| ROW DECODE (FIGS. 28 and 29, Sheet 18) | 23 |
| Alternative Matrix Arrangement | 23 |
| Claims | 24 |

In the field of printing, the need for relatively simple printers capable of printing continuously changing data at extremely high speeds led to the development of the matrix or dot printer. This printer utilizes a plurality of dot-impressing printing elements arranged in a matrix so as to print configurations of characters by the proper selection of available dots. It is well known that, depending upon the shape and quantity of print heads used, matrix printers can print a fragment of a character, a whole character, a line of characters, or even an entire page at one time. The matrix printer art is developed to a high state of proficiency, and the operational details of such printers are well known. However, since the printing is fragmentary, that is, less than a complete solid character is printed, matrix printed characters are difficult to read. Furthermore, in order to get each character to conform within a matrix (such as the often used five by seven matrix), the shape of the characters are somewhat distorted. For instance, the letter "I" has as wide a horizontal branch on the top and bottom as do the "T" and the "E." Furthermore, certain letters, such as the "N" are nonsymmetrical and need an even number of vertical columns of dots, while letters like "M" and "W" must have an odd number of vertical columns. This makes certain letters confusingly similar with other letters, and causes some of the letters to be sufficiently unlike the regular printed form thereof to make character recognition difficult for the reader. Together, these problems have prevented the adoption of matrix printers in many applications. In fact, matrix printing of entire pages has been done commercially very little indeed.

It is therefore a primary object of this invention to provide a high speed printer with improved legibility.

Another object is to provide matrix printing with easily recognized characters.

The prior art includes regular printing presses of the type wherein the type must be "set." In the common printing press, the use of proportionally spaced characters has long been widespread. For instance, a "W" is wider than an "I," and is given more printing space than the "I." These printers are far too slow for data processing use. The prior art also includes typewriters which print characters of variable widths. In general, this is achieved in typewriters by having the actual type font prepared in different widths, and by providing carriage motion which is smaller for narrow characters and larger for wider characters. These typewriters are too slow for many data processing applications.

Since the development of the proportionally spaced typewriter, it is not uncommon for one to encounter nothing but proportionally spaced printing in a given office or given business concern. It actually becomes more difficult for a person to read matter which is printed in nonproportional form. Therefore, another factor contributing to the difficulty of reading prior art matrix printers is the nonproportionality of the characters themselves.

Other objects of the invention include the provision of:

A matrix or dot printer capable of printing characters with either an even or an odd number of vertical columns of dots;

A matrix printer capable of printing proportionally spaced characters;

Proportional space control apparatus compatible with matrix printers having various print head configurations;

Proportional space printer apparatus capable of operating the least expensive configuration of matrix printer;

Relatively simple control apparatus for operating a matrix printer in proportional space fashion.

This invention is predicated on the division of the printed line into matrix areas, which areas may correspond to the successive printing positions of a single, serially-operated matrix print head or to the respective positions of a plurality of matrix print heads, depending on the style of matrix printer in use.

In accordance with the present invention, sufficient characters of any width are stored in preparation to print an entire matrix area, the portion of any character not fitting within the matrix area being considered an overflow portion, which is later printed as a first portion of an adjacent matrix area, along with all or part of a subsequent character. For instance, in one embodiment of this invention, a matrix area is ten characters wide, which is wide enough to print the widest character (a "W"). In that embodiment, an "I" consumes four spaces, as does a blank space between characters. Therefore, more than just an "I" or blank space would have to be taken into account before printing would be effected according to the present invention. If the sequence were "I," blank space, "W," the first two columns of dots in the "W" would be printed with the "I" and the blank space, and the remaining seven columns of dots plus a one-dot space would be stored for printing in the next adjacent matrix position.

This invention permits proportional space matrix printing one row of data at a time, a full line of characters at a time or an entire sheet at a time; with one or a plurality of print heads, having one dot or a plurality of dots, or any other print head configuration compatible with the above. Further, printing may occur with the paper in flight (continuous paper motion) or with the paper at rest (incremental paper motion).

The realization of this invention in a concrete embodiment is relatively simple, and it may operate semi-asynchronously with respect to a paper feeding and/or print impression mechanism.

The foregoing and other objects, features and advantages of the invention will be apparent from the following more particular description of preferred embodiments thereof as illustrated in the accompanying drawings.

In the drawings:

FIG. 1 is a simplified schematic diagram illustrating, in a broad sense, the operation of one embodiment of this invention;

FIG. 2a is a schematic block diagram of one embodiment of a proportional space matrix printer in accordance with the present invention;

FIG. 2b is a simplified schematic block diagram of apparatus external to the described embodiment of the invention, which apparatus supplies characters to be printed to be described embodiment of the invention;

FIG. 3 is a chart illustrating the operation of the device shown in FIG. 2 in an "initiate" cycle and in establishing conditions prior to the "initiate" cycle;

FIG. 4 is a chart illustrating the operation of the device shown in FIG. 2 during a "modular count" cycle of operation;

FIG. 5 is a chart illustrating the operation of the device shown in FIG. 2 during "adjust" and "row end" cycles of operation;

FIG. 6a is a schematic diagram illustrating a typical gate block;

FIG. 6b is a diagram illustrating the timing relationship of the input and output signals of the gate block shown in FIG. 6a;

FIG. 7 is a schematic diagram illustrating a typical trigger block;

FIG. 8 is a schematic block diagram illustrating in further detail the circuitry which comprises the trigger block of FIG. 7;

FIG. 9 is a schematic diagram illustrating a typical latch block;

FIG. 10 is a schematic block diagram illustrating in further detail the circuitry which comprises the latch block of FIG. 9;

FIG. 11 is a schematic block diagram of a timing generator;

FIG. 12 is a timing chart showing the timing pulses generated by the device of FIG. 11;

FIG. 13 is a schematic block diagram of a control circuit for the embodiment shown in FIG. 2;

FIG. 14 is a schematic block diagram of a character register for the embodiment shown in FIG. 2;

FIG. 16 is a schematic diagram of a print decode matrix for the embodiment shown in FIG. 2;

FIG. 17 is a schematic block diagram of a width decode circuit for the embodiment shown in FIG. 2;

FIG. 18 is a schematic block diagram of a modular counter for the embodiment shown in FIG. 2;

FIG. 19 is a schematic block diagram of a modular accumulator for the embodiment shown in FIG. 2;

FIG. 20 is a schematic block diagram of a modular count register for the embodiment shown in FIG. 2;

FIG. 21 is a schematic block diagram of a position decode circuit for the embodiment shown in FIG. 2;

FIG. 22 is a schematic block diagram of a register address selector for the embodiment shown in FIG. 2;

FIG. 23 is a schematic block diagram of a print register for the embodiment shown in FIG. 2;

FIG. 24 is a schematic diagram of alternative print elements for use in the print register shown in FIG. 23;

FIG. 25 is a schematic diagram of an overflow register for the embodiment shown in FIG. 2;

FIG. 26 is a schematic block diagram of a matrix counter for the embodiment shown in FIG. 2;

FIG. 27 is a schematic block diagram of a row counter for the embodiment shown in FIG. 2;

FIG. 28 is a schematic block diagram illustrating a row decoder for the embodiment shown in FIG. 2;

FIG. 29 is a chart illustrating the row code governing the operation of the row decoder of FIG. 28.

OPERATION IN BRIEF

Figure 15:
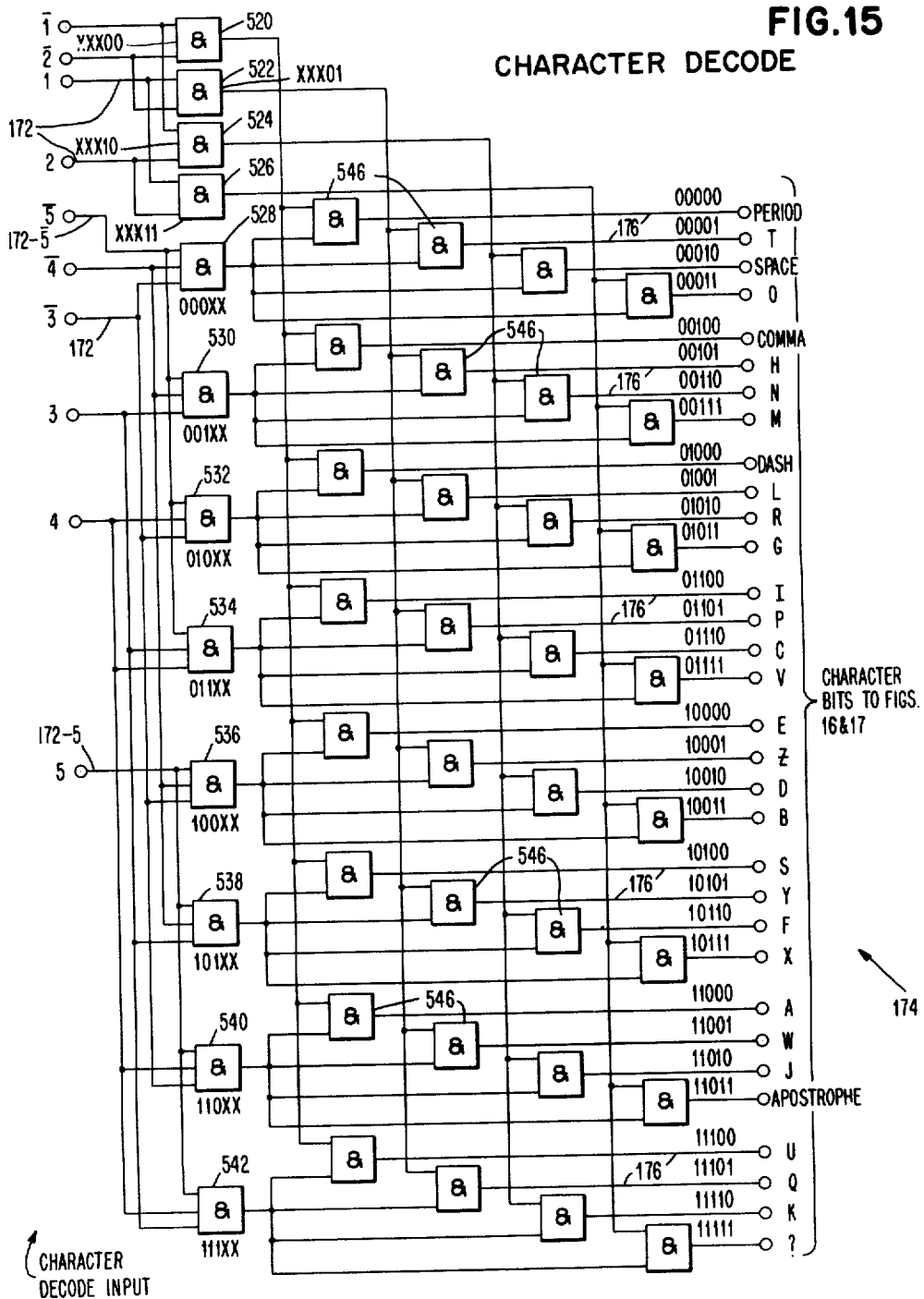
FIG. 15 is a schematic block diagram of a character decode circuit for the embodiment shown in FIG. 2.

At the top of FIG. 1 is shown a print receiving web 100 which may comprise a sheet of paper or a multiple form including several layers of paper interleaved with carbon. This will hereinafter be referred to as the paper. Associated with the paper 100 is a plurality of print is a plurality of print matrix positions 102 at which printing of a plurality of dots in one row may be effected. For purposes of illustration, the embodiment described contains forty-nine matrices, forty-eight of which are regular print matrix positions, and the forty-ninth serving to print whatever is left over of a final character at the end of a row. In the embodiment to be described, one well-known printing head (not shown) having ten dot impressing elements in a horizontal row may print the entire line of characters by moving through successive matrix positions 102 in sequence or forty-nine printing heads (not shown) may be provided, each to operate in turn. In either case, the matrix printing positions must be skewed as shown in FIG. 1 if the paper is to move continuously during printing so as to provide an ordinal line of characters. This is unnecessary if the paper is stopped for each row of printing.

Shown on the paper 100 are a plurality of dot positions; the hollow dot positions 104 illustrate areas where printing will be effected to complete the line of characters, the solid dots 106 illustrate dots which have previously been printed, and the hollow dots with X's in them 108 illustrate dots which are being printed in the current print cycle. The dots 104, 106, 108 illustrate the mode of printing in this embodiment which comprises printing the top row of dots for each character in a whole line of characters, then printing the second row of dots for all of the characters in the entire line, and continuing in that manner to build the seven rows which form a line of characters, one row of dots at a time.

Characters of different width are shown on the paper 100. For instance, the blank (or space) and the "I" are each alloted four spaces, the "H" is allotted six spaces, the "N," "O," "S," and "T" are allotted eight spaces, and the "W" is alloted ten spaces. Notice that each character begins in the first vertical column of its space allotment and has associated with it one or two columns or spaces between itself and the next character: The "I," "T" and "W" each have one vertical space following the character within the character space allotted; similarly, the "N," "O," "S" and "H" each have two vertical spaces following the character. This variable character space following each character allows each character to be generated within either an even or an odd number of vertical columns of dots in order to most nearly duplicate the true, printed configuration of the same character. In other words, each character can assume the most appropriate shape, using either an even or odd number of columns as necessary. Since the "I" is only three dots and one space wide whereas the "T" is seven dots and one space wide, the usual confusion between a matrical "I" and a matrical "T" is thus eliminated. These characteristics of the matrical characters shown in FIG. 1 are what make each character more easily recognized, thereby causing smoother, nonstrenuous reading.

The circuits of FIG. 1 are shown with conditions established to print the "W." Note that FIG. 1 is not an accurate schematic of an embodiment, but is merely a stylization of the operation of an embodiment. As shown in FIG. 1, the 2nd MATRIX 102 is about to print dots in its fourth and seventh dot position. Note that this comprises a dot from the letter "O" and a dot from the letter "W" with the space between letters falling in the middle of the 2nd MATRIX position. It is the ability of the matrixes to print fragments of different characters at one time which gives this printer proportional space capability. This is achieved by a PRINT REGISTER 110 which stores one or more characters as necessary in order to supply correct dot bit information to an entire matrix 102 at one time. In conjunction with the PRINT REGISTER 110, an OVERFLOW REGISTER 112 stores that portion of a character which will not fit in the PRINT REGISTER 110; for instance, the dot 108 of the letter "W" is stored in the seventh bit position of the PRINT REGISTER 110 and will be printed at the 2nd MATRIX position 102, whereas the dot 104 of the letter "W" is stored in the fifth position of the OVERFLOW REGISTER 112 and will subsequently be printed at the 3rd MATRIX 102. After the 2nd MATRIX is printed, the contents of the OVERFLOW REGISTER 112 will be shifted into the PRINT REGISTER 110, so that the dot 104 of the letter "W" may subsequently be printed at the 3rd MATRIX in response to a bit stored in the fifth position of the PRINT REGISTER 110.

Taking as an example the simplified operation of a few print cycles in which the second row of the letters "N," "O" and "W" are printed, the first thing that occurs is placing the first character, from memory, into CHARACTER REGISTER AND DECODE circuitry 120. The character may be manifested in the form of any well-known data processing code; here, a five bit computer code is applied to the CHARACTER REGISTER AND DECODE circuitry 120 by a trunk of five lines 122. The character is then decoded into the correct one of thirty-two possible characters, there being one line in a trunk of thirty-two lines 124 for each possible character. The character in the trunk of thirty-two lines 124 is applied to a PRINT DECODE circuit 126 where it is subsequently decoded. The trunk of lines 124 are also connected to a WIDTH DECODE circuit 128 which indicates the proper width of the character. For instance, the character "W" shown schematically on the paper 100 is ten dots wide (including the one dot vertical space) and therefore has caused the WIDTH DECODE circuit 128 to indicate a width of ten units. The width determined by the WIDTH DECODE circuit 128 is utilized to set a MODULAR COUNTER 130 to a corresponding position. In this embodiment, the MODULAR COUNTER 130 is capable of counting from zero through decimal value five, which values are given the width values of zero, two, four, six, eight and ten, respectively. Once the MODULAR COUNTER is set to a value corresponding with the width of a character (e.g., ten), a timing signal on a line 132 will cause ADVANCE MODULAR COUNT lines 134 to simultaneously step the MODULAR COUNTER 130 and a MODULAR ACCUMULATOR 136. In the given example, prior to the advancement of the MODULAR ACCUMULATOR 136 in response to the "W," the MODULAR ACCUMULATOR 136 was set at six, indicating that the "W" should be printed in the sixth position of a matrix. Then, the MODULAR COUNTER stepped from ten, to eight, to six, to four, to two, to zero while the MODULAR ACCUMULATOR advanced from six, to eight, to zero, to two, to four, to six. The output of the MODULAR ACCUMULATOR 136 on line 138 is controlled by GATE circuitry 140 so as to change the setting of a MODULAR COUNT REGISTER 142 only at a proper time. Thus the setting of the MODULAR ACCUMULATOR 136 in response to the "O" is stored in the MODULAR COUNT REGISTER 142 so as to control the positioning of the "W" while the "W" advances the MODULAR ACCUMULATOR 136 so as to control the printing of the next character (or space, as the case may be). It is therefore apparent, that the MODULAR ACCUMULATOR takes into account the width of each character so as to select the position within the matrix of the next character.

When the MODULAR ACCUMULATOR is advanced from eight to zero, it generates an OVERFLOW signal on a line 144 which advances a MATRIX COUNTER 146. The MATRIX COUNTER selects the matrix position within which each character is to be printed. The OVERFLOW signal on line 144, however, does not immediately advance the MATRIX COUNTER, so that printing is effected within the matrix position selected by the next preceding character. In this manner, the MATRIX COUNTER operates similarly with the operation of the MODULAR ACCUMULATOR, in taking into account the sum total of widths of all the characters printed to determine at which matrix position the next printing operation is to be effected.

In a similar manner, the MATRIX COUNTER, when advancing from position forty-eight to position one will generate an OVERFLOW signal on a line 147, which signal will advance a row counter 148. In the present embodiment, seven rows of dots are used to print a line of characters, printing being effected one row at a time. When seven rows have been printed, a whole new set of characters are selected for printing in row positions beginning three rows below the last line of characters. The OVERFLOW signal on line 147 also designates the end of a row, which is described more fully hereinafter.

Returning now to the PRINT DECODE circuit 126, the character indicated by the trunk of thirty-two lines 124 is stored in a matrical fashion within the PRINT DECODE circuit 126. Note that the entire character (such as the "W" of the instant example) is stored in the PRINT DECODE circuit 126. However, only one row of the character is read out of the PRINT DECODE storage matrix at a time. Which of the seven rows of the character is to be read out is determined by the output of the row counter 148, which in the present instance would be the second row as indicated by a line 149. The output of the second row of storage of the PRINT DECODE circuit 126 is read into a REGISTER ADDRESS SELECTOR 150 where it can be directed to in any ten positions of either the PRINT REGISTER 110 or the OVERFLOW REGISTER 112. If the output of the PRINT DECODE circuit 126 is to be stored entirely in the PRINT REGISTER, the REGISTER ADDRESS SELECTOR 150 will cause no shift to occur. On the other hand, if, as in the instant case of the letter "W," the output of the PRINT DECODE 126 is to be stored partially in the PRINT REGISTER and partially in the OVERFLOW REGISTER, then the REGISTER ADDRESS SELECTOR 150 will cause the character to be shifted some even number of spaces to the right as shown in FIG. 1. The amount of shift which occurs is determined by the output 143 of the MODULAR COUNT REGISTER 142. After printing of the last part of the "O" and the first part of the "W," the contents of the OVERFLOW REGISTER are shifted to the PRINT REGISTER, and the last part of the "W" will therefore be printed in the left-most section of the next subsequent print matrix position.

In summation of the operation in brief, the character is received and decoded, the decoded character going to a PRINT DECODE circuit and to a WIDTH DECODE circuit. The width of the character is set in a MODULAR COUNTER, which counts down from the given width to zero, at the same time that the MODULAR ACCUMULATOR is counting ahead by the same number of spaces from the last position at which it was set. The setting of the MODULAR ACCUMULATOR by each character determines the position within a matrix wherein the next character will be printed. This fact is set in the MODULAR COUNT REGISTER to control the printing of the next character. When the MODULAR ACCUMULATOR overflows and steps from eight to zero, it will establish a condition so that the MATRIX COUNTER can advance by one position. However, the MATRIX COUNTER will not advance until after printing is effected of the character which causes the overflow to advance the MATRIX COUNTER. An overflow from the MATRIX COUNTER indicates that one row has been printed, and advances a ROW COUNTER. The ROW COUNTER controls reading out of the particular row of the PRINT DECODE circuit which is to be printed during the current operation. The MODULAR COUNT REGISTER determines how much shift (if any) is to be given to the output of the PRINT DECODE circuit so as to store it in proper positions of the PRINT and OVERFLOW REGISTERS. Thus the character can be partially printed in one matrix position and partially in an adjacent matrix position.

BLOCK DESCRIPTION

Control

A preferred embodiment of the invention is shown in complete block form in FIG. 2a (Sheet 2). This embodiment is controlled by a cyclic succession of four timing pulses A, B, C and D as shown in FIG. 12 (Sheet 8). In the lower right-hand corner of FIG. 2a, a CONTROL circuit 160 supplies a plurality of outputs including four outputs which divide the operation of the device into different control cycles, each of which is subdivided by the timing pulses A–D. For instance, the first part of a printing operation is controlled by an INITIATE cycle, indicated in FIG. 2a as "IC," which is designated by a line 162. Following that, there is provided one or more MODULAR COUNT cycles (MCC) on line 164, and an ADJUST cycle on line 166. After an ADJUST cycle, the device can either return to the INITIATE cycle or can be governed by the ROW END cycle on a line 168, as described more fully hereinafter.

Starting

The sequence of operation of one embodiment of this invention is illustrated by flow diagrams shown in FIGS. 3–5 (Sheets 3–5). Referring to FIG. 2a, a printing operation can be started by MANUAL START signal on a line 165 as illustrated in FIG. 3 by box 193 or MACHINE START signal on a line 167 as illustrated by box 194. Either of these can be activated at any time, but the following operations will be performed only at D-time. As described hereinafter, starting is prohibited if a STOP signal is present on a line 169. To start an operation, the following functions are performed: RESET OVERFLOW TRIGGERS 195, CALL NEXT CHARACTER 196, RESET ADJUST AND ROW END CYCLES 197, and SET INITIATE CYCLE 198. Although the blocks 195–198 are set out in sequence, all of these operations take place essentially simultaneously. This is true of all the operations illustrated in the flow diagrams of FIGS. 3–5 except for one instance, which will be particularly pointed out hereinafter. Referring back to the lower right of FIG. 2a, when printing is to begin, a new character is acquired by a CALL NEXT CHARACTER line 161, a plurality of overflow triggers (described hereinafter) are reset by a RESET OVERFLOW TRIGGER signal (R) on a line 163 and the INITIATE cycle (IC) is set as indicated on line 162.

Initiate cycle

Referring to the upper left of FIG. 2a, a CHARACTER REGISTER 170 is reset (as indicated by the corner block with the "R" in it) during the INITIATE cycle at A-time. A character is provided in the form of a five-bit code on a trunk of five lines 122 (from a buffer 304 shown in FIG. 2b), and these are set into the CHARACTER REGISTER 170 (as indicated by the "S" in the upper-left corner of the CHARACTER REGISTER block) during the INITIATE cycle at B-time. The character code bits stored in the CHARACTER REGISTER 170 are transmitted, along with the complement (or inverse) of each of the code bits, over a trunk of ten lines 172 to a CHARACTER DECODE circuit 174. The CHARACTER DECODE circuit 174 automatically energizes one out of thirty-two possible lines which corresponds to the particular character stored in the CHARACTER REGISTER 170. The output of the CHARACTER DECODE circuit 174 is applied over a trunk of thirty-two lines 176 to the PRINT DECODE circuit 126 which will generate a representation of each character in the form for matrix printing; that is, wherein the character is represented as selected ones of a plurality of dots in a matrix. Thereafter, only a single row of this representation is read out at one time, so as to permit printing only a single row of the seven rows of dots which comprise a character, as before described.

The output of the CHARACTER DECODE circuit 174 is also applied over the trunk of thirty-two lines 176 to a WIDTH DECODE circuit 128, where the character width is determined to be four, six, eight or ten dot positions as indicated in a trunk of four lines 180 which feed the MODULAR COUNTER 130. Thus, width information is available at the MODULAR COUNTER during B-time of the INITIATE cycle. However, the MODULAR COUNTER 130 is set at D-time of the INITIATE cycle. The PRINT DECODE circuit 126 is set at C-time of the INITIATE cycle. It is to be noted that decoding is effected on the basis of row information on the trunk of seven lines 182 as determined by the next prior character, since, as described fully hereinafter, the row counter 148 (shown in FIG. 2a as combined with a row decode circuit in the ROW COUNTER AND DECODE block 148a) is not advanced until the ADJUST cycle. Therefore, during the first part of a printing operation, the trunk of seven lines 182 will designate the first row. The character is thus printed before it will contribute to a change in the row indicated by the output of the ROW COUNTER on the trunk of seven lines 182. Referring now to FIG. 3, and assuming that the conditions of the upper part of FIG. 3 have been met so that the INITIATE cycle is set as indicated in the block 198, the operations just described may now be followed through the chart. At A-time of the INITIATE cycle, the CHARACTER REGISTER 170 is reset (199) and it is set (200) with a new character at B-time. Then, at C-time, the PRINT DECODE circuit 126 is set (201) with information coming from the CHARACTER DECODE circuit 174. At D-time, the MODULAR COUNTER 130 is set, as indicated by the block 203. This is the last of the operative functions of the INITIATE cycle; during D-time, however, the INITIATE cycle is reset and the MODULAR COUNT cycle is set as indicated by the blocks 204 and 205, respectively.

Modular Counting

Returning now to FIG. 2a, once the MODULAR COUNT cycle is set, the MODULAR COUNTER 130 and the MODULAR ACCUMULATOR 136 are advanced at B-time and again at D-time, as indicated by the two "ADV" (advance) blocks shown within the blocks 130 and 136. The MODULAR COUNTER 130 and MODULAR ACCUMULATOR 136 will be advanced by as many successive B and D pulses as are necessary, until the MODULAR COUNTER reaches zero and generates an END MODULAR COUNTING signal on a line 184. This will "STOP" the advancing of the MODULAR COUNTER 130 and MODULAR ACCUMULATOR 136. Once the MODULAR COUNTER reaches zero, as indicated by the signal on line 184, the MODULAR COUNT REGISTER 142 is set at the next C-time of the MODULAR COUNT cycle. Note that the MODULAR COUNT REGISTER 142 is reset in the MODULAR COUNT cycle at D-time, or more correctly, at the end of D-time (as described more fully hereinafter), unless inhibited by the END MODU- LAR COUNTING signal on line 184. Thus, the MODULAR COUNT REGISTER is always set at zero during the second time (D time) that the MODULAR COUNTER and MODULAR ACCUMULATOR are advanced so that it will be reset before the second C-time of the MODULAR COUNT cycle. Since each character is at least four dot positions wide, the MODULAR COUNTER will be advanced at least twice prior to reaching zero, and therefore, the MODULAR COUNT REGISTER 142 will b reset prior to a C-time which is concurrent with the MODULAR COUNTER having been stepped to zero. After that, the MODULAR COUNT REGISTER 142 is prevented from being reset by the END MODULAR COUNTING line 184.

At C-time, after the END MODULAR COUNTING line 184 becomes energized, the content of the MODULAR ACCUMULATOR is transferred over a trunk of three lines 186 and set into the MODULAR COUNT REGISTER 142. This is immediately transferred over another trunk of six lines 188 to a POSITION DECODE 190 which determines the specific position within the PRINT and OVERFLOW REGISTERS 110, 112 where the character now in the PRINT DECODE circuit 126 must be stored. That is accomplished by a coded designation of the five possible positions passing over trunk of five lines 192 to the REGISTER ADDRESS SELECTOR 150.

The REGISTER ADDRESS SELECTOR 150 will simultaneously respond to character bit designations from the PRINT DECODE circuit 126 on a trunk of ten lines 151 and the position bits on the lines 192 to send a coded manifestation of the character to be printed for storage in the PRINT and OVERFLOW REGISTERS 110, 112. This is so because the PRINT DECODE circuit 126 is decoded, which sends the character bits out on lines 151, and the REGISTER ADDRESS SELECTOR 150 is commanded to "LOAD" the PRINT and OVERFLOW REGISTERS, both at the first C-time of a MODULAR COUNT cycle. This timing is controlled by a FIRST AND LAST MODULAR COUNT signal on a line 490, which appears during the first A- through D-times and the final A- through D-times of modular counting, and by inhibiting the "DECODE" and "LOAD" (via line 184) after modular counting has ended. Since the last MODULAR COUNT cycle occurs after modular counting has ended, only the first C-time will operate these circuits.

Reviewing the operation of the MODULAR COUNT cycle with respect to FIG. 4, during A-time, if modular counting has ended as determined by the block 206, the FIRST AND LAST MODULAR COUNT trigger is set, as indicated by block 206a. At B-time, if counting is not ended, the modular count will be advanced as indicated by block 207. Again, if modular counting has not ended as indicated by the block 208, and if the FIRST AND LAST trigger is on as indicated by block 208a, the PRINT and OVERFLOW REGISTERS will be loaded as indicated by block 216 at C-time, and the MODULAR COUNT REGISTER and FIRST AND LAST trigger will both be reset as indicated by blocks 212 and 212a, and modular count will be advanced, all at D-time, as indicated by the block 210. After advancing modular count in D-time, a second modular count cycle may be taken. For all characters having four-dot widths, this will be the last modular count advancement. For characters having a six-dot width, an additional advancement of the modular count (the next B-time) must be made, and so forth. After advancing the modular count each time as indicated by the blocks 207, 210, the modular count is tested again (blocks 206, 208) and if modular counting has ended, the MODULAR COUNT REGISTER is set at C-time as indicated by the block 218. If the FIRST AND LAST trigger is not on as indicated by the block 220, operation returns through point X and to block 206 which now indicates that modular counting has ended therefore causing the setting of the FIRST AND LAST trigger as indicated by block 206a. As indicated by block 218, the MODULAR COUNT REGISTER might be set again at this time. However, this sets the same information into the MODULAR COUNT REGISTER as is already set there, and is therefore insignificant. Then the block 220 will indicate that the FIRST AND LAST trigger is on, which will cause the MODULAR COUNT cycle to be reset as indicated by block 222, and the ADJUST cycle to be set as indicated by block 224. Operation is shifted to the ADJUST cycle (shown in FIG. 5) through point Y.

*Adjust cycle—printing*

The ADJUST cycle performs the actual printing if sufficient characters have been received and stored in the PRINT and OVERFLOW REGISTERS so as to fill up the PRINT REGISTER. Otherwise, the ADJUST cycle merely serves as a transition between the MODULAR COUNT cycle and the INITIATE cycle.

Returning to the INITIATE cycle will cause the device to call the next character and prepare the next character for printing with the prior character or a fragment of the prior character. This is best illustrated with reference to FIG. 5. At A-time of an ADJUST cycle, if the MODULAR ACCUMULATOR has not overflowed as indicated by the box 230, nothing happens until D-time, at which time operation passes through point Z to FIG. 3. The OVERFLOW triggers will be reset (unnecessarily, in this instance, since they are not yet set) as indicated by box 195, the next character will be called for as indicated by the box 196, the ADJUST cycle will be reset, and the ROW END cycle will be unnecessarily reset as indicated by the box 197, and the INITIATE cycle trigger will be set as indicated by the box 198. Now, a new character is processed through the INITIATE and MODULAR COUNT cycles as described hereinbefore.

Returning now to FIG. 5, if the MODULAR ACCUMULATOR has overflowed as indicated by the box 230, the MATRIX COUNTER 146 will be advanced at A-time as indicated by the box 232. Also at A-time, the contents of the PRINT REGISTER 110 will be gated out over a trunk of ten lines 235 to cause printing by PRINT MECHANISM 134 (shown in the upper right of FIG. 2a), as indicated by the box 236. This is shown in FIG. 2a by the "PRINT" block within the PRINT REGISTER 110. If the MATRIX COUNTER has overflowed as indicated by the box 238, the ROW COUNTER 148 will be advanced during A-time as indicated by the box 240. This happens automatically by an advancement of the MATRIX COUNTER which causes an overflow. In FIG. 2a this is illustrated by the "ADV." (advance) block within the MATRIX COUNTER 146. At any event, during B-time of the ADJUST cycle, the PRINT REGISTER 110 is reset as indicated by the box 242 and the "R" (reset) block within the PRINT REGISTER. At C-time of an ADJUST cycle, the contents of the OVERFLOW REGISTER 112 is transferred over a trunk of eight lines 244 to the PRINT REGISTER 110 as indicated by the box 246 and as shown by the "XFER" (transfer block) within the OVERFLOW REGISTER 112 in FIG. 2a. Following this, at D-time of an ADJUST cycle, the OVERFLOW REGISTER 112 is reset, as indicated by the box 248 and the "R" block of the OVERFLOW REGISTER. If at this time, the MATRIX COUNTER 146 has not counted past forty-eight, indicating that an entire row of dots has not yet been printed, the operation is directed back to point Z of FIG. 3 as indicated by the box 250 so as to call further characters for printing. On the other hand, if the forty-eighth character has been printed, the MATRIX COUNTER 146 will have overflowed and will have advanced the ROW COUNTER 148 and supplied a MATRIX OVERFLOW signal on the line 252 to the control unit 160 indicating that it is time to print the last character of a row. This causes the setting of the ROW END cycle as indicated by the box 254.

*Row End—printing of last character*

Recalling that the ROW COUNTER (which keeps track of which row of dots is being printed), the MATRIX COUNTER (which determines at which matrix position printing is to be effected), and the MODULAR ACCUMULATOR (which determines which dot position of a matrix is to be the first dot of a character being printed) are all set by one character in preparation for the next character, when the forty-eighth character has been printed, and the ROW END cycle is set, it is therefore possible to print whatever has been transferred into the PRINT REGISTER without any further operations. Referring to the bottom of FIG. 5, at A-time of a ROW END cycle the content of the PRINT REGISTER is gated out to cause printing by the PRINT MECHANISM 234 as indicated by the box 256. This is accomplished by the fact that the ADJUST cycle is not reset when the ROW END cycle becomes set. Therefore, all of the ADJUST functions can be performed during a ROW END cycle. Specifically, printing at A-time as indicated by the block 256 is the same as indicated by the box 236. Similarly, the PRINT REGISTER 110 will be reset at B-time of ROW END cycle as indicated by the box 258 by the same means as caused resetting of the PRINT REGISTER as indicated by the box 242 in B-time of the ADJUST cycle. Also (although left off the flow diagram of FIG. 5 since nothing is accomplished thereby), the content of OVERFLOW REGISTER is transferred to the PRINT REGISTER and the OVERFLOW REGISTER is reset at C- and D-times, respectively, of each ROW END cycle. However, since the OVERFLOW REGISTER has remained reset from being reset at D-time of the next previous ADJUST cycle, there is nothing to transfer into the PRINT REGISTER during a ROW END cycle.

In the embodiment being described, printing is effected one row at a time, and therefore, as each row is printed, it is necessary for each character in the line to be read out from the BUFFER STORAGE 304 (shown in FIG. 2b) at least seven times. Although this invention is not concerned with the mechanism to provide the character seven times, FIG. 2b illustrates, in simplified block form, an example of the type of circuitry which would be necessary in order to accommodate the embodiment here being described. Some source of characters such as a MEMORY or COMPUTER 300 may be connected through suitable GATE circuitry 302 to the BUFFER STORAGE device 304. Since forty-eight print positions are possible, the smallest character (the "I" or blank space, each of four-dot width) could be printed 120 times, though it is highly unlikely to occur. This is determined by forty-eight matrixes containing ten-dot positions each giving a total of four hundred and eighty dot positions which will print 120 four-dot wide characters. The particular character stored in BUFFER STORAGE 304 may be selected by any suitable means, such as 120-position ring circuit 306. Thus, the first character would be read out of BUFFER STORAGE 304 by the 1-position of the ring and the 120th character would be read out of storage by the 120-position of the ring. The output of the buffer storage may be passed through suitable GATE circuitry 308 onto the trunk of five lines 122 for transmission to the CHARACTER REGISTER 170 (FIG. 2a). When each row of printing is completed, the ring 306 is returned to the first position by the output 310 of an AND circuit 312. Each time that the control unit 160 (FIG. 2a) energizes the CALL NEXT CHARACTER line 161, the GATE 308 (FIG. 2b) will be opened, sending the next character to the CHARACTER REGISTER 170. The ring 306 will then be advanced one position so as to prepare the CHARACTER BUFFER STORAGE 304 to send the next subsequent character.

Referring again to FIG. 5, the MODULAR ACCUMULATOR and MODULAR COUNT REGISTER are reset at C-time of the ROW END cycle as indicated by the box 260 and the "R" blocks in FIG. 2a. This is to get rid of the modular setting established by the characters used to print in the forty-eighth matrix with possible overflow into the forty-ninth matrix, since at the start of the next row, the MODULAR ACCUMULATOR and the MODULAR COUNT REGISTER will be set to zero to start the first character printing in the leftmost dot position. Also at C-time, the buffer ring 306 (FIG. 2b) is reset to the first position as indicated by box 262. Note that whenever the ROW COUNTER overflows and provides an OVERFLOW signal on a line 266, this is an indication that seven rows of dots have been printed, and it is now time to start printing a new line of characters. For simplicity, this operation has been called a skip operation, and is effected by a SKIP signal output from the CONTROL unit 160 on a line 268. This line energizes gate 302 (FIG. 2b) to call a whole new set of up to 120 characters into the buffer storage 304. In the flow diagram of FIG. 5, when the ROW COUNTER has overflowed as indicated by box 264, skip operation is effected as indicated by box 270. At any event, if a stop is then indicated, all functions of the apparatus being described will cease as indicated by the stop block 267. If a stop is not indicated in a cycle wherein the ROW COUNTER overflows and a skip operation is being initiated, then operation returns through point Z at the bottom of FIG. 5 to point Z at the top of FIG. 3 and then proceeds as described hereinbefore.

INTRODUCTION TO DETAILED DESCRIPTION

The type of hardware utilized to implement an embodiment of this invention is immaterial. However, complementary transistor resistor logic is suitable, and has the advantage of providing complementary outputs from the circuits used—that is, an output which is in phase with the input as well as an output which is out of phase with the input. For simplicity, the invention is described herein in terms of non-inverting, simplified, positive logic blocks. For instance, an AND circuit is a block with an "&" in it, an OR circuit is a block with an "O" in it and an inverter is a block with an "I" in it. It should be understood that simplified description through the use of positive logic, using positive command signals which are demonstrative of the logic, has required the use of some redundant circuits. For instance, the modular count advancing circuitry is shown both in FIG. 18 and in FIG. 19. Also, this has resulted in the use of inverting blocks in certain cases wherein the signal is actually inverted twice before use. Furthermore, many of the circuit blocks may need duplication in order to provide sufficient power in an actual machine. It should be obvious to one skilled in the art that this is for descriptive purposes only, and that when embodied in a particular machine, the usual well-known techniques of circuit implementation would dictate addition of powering circuits and elimination of redundant circuits.

Another type of logic block which is well known in the art is shown in FIG. 6a. This is a gate block 310 which is shown as a box with a "G" in it. The gate block converts the rise of an A.C. or square wave signal 311 (FIG. 6b) on a line 312 into a sharply peaked pulse output 313 on a line 314, but only when a D.C. gate signal 315 is applied to an input 316. In certain instances, the gate block 310 is utilized only to provide a pulse output, without using a gate signal at the input. In such instances, the D.C. gate line 316 is shown with a plus sign at its input. Therefore, any rise on the A.C. signal line 312 will provide a pulse output on a line 314.

Another well-known circuit element is the trigger block 320 shown in FIG. 7. This trigger block is equivalent to the trigger circuit shown in FIG. 8, wherein a flip-flop pair 321 of any suitable well-known type may be switched on and off by respective AND circuits 322 and 323 each of which is controlled by an A.C. line 324, 325 and a gate line 326, 327 fed through a delay unit 328, 329. When the flip-flop pair is in the ON state, an upper output terminal 331 is positive and a lower output terminal 332 is negative. When the flip-flop pair is OFF, the polarity of the terminals 331, 332 is reversed. In operation, if the A.C. set line 324 is energized by a rising level of potential at a time when there is an output from the delay unit 328 resulting from a signal having been on the line 326, then the flip-flop pair 321 will turn ON or will remain ON. Similarly, if positive shift A.C. reset signal is applied to line 325 at a time when a reset gage signal on line 327 is causing an output from the delay unit 329, then the flip-flop pair will be turned OFF or will remain OFF. Referring to FIG. 7, note the position of the gates. The set gate is the highest (or upper-most) input to the trigger, and the reset gate is the lowest input to the trigger. This symbolism is used throughout the entire specification.

Another well-known type of circuit is the latch block 336 shown in FIG. 9. One form of equivalent circuit for the latch block is the latch circuit shown in FIG. 10. When an input signal is applied to a set line 337, the output signal will appear on the line "1" 338. The line 338 will remain energized indefinitely, until the latch is affirmatively reset by a reset signal on a line 339, after which the output will appear on the "0" line 340. In FIG. 10, a set signal on line 337 will cause an output to an OR block 342 to be passed through an inverter 344 and amplified by a cathode follower 346. The output of the cathode follower is therefore out of phase with the set input on line 337, which means in the positive logic being used in this description, that the zero line 340 will be negative. Assuming that the reset line 339 has not been energized, it is also negative, meaning that there will be no output from an OR block 348 and that therefore the output of an inverter 350 will be positive and, after amplification in the cathode follower 352, will comprise a positive output signal on the "1" line 338. Similarly, but opposite operation obtains when the reset line 339 is energized.

DETAILED DESCRIPTION

Timing generator

FIGS. 11 and 12 (Sheet 8) illustrate the generation of four sub-cycle timing pulses A, B, C, D. An oscillator 400 provides a square wave signal 402 (FIG. 12) on an outline 404 (FIG. 11). The square wave is inverted in an inverter 406 for application over a line 408 to both the A.C. set and A.C. reset inputs of a trigger 410. The square wave on line 404 is also applied to the input of another trigger 412. Since the triggers 410, 412 work on rises in voltage applied to both the A.C. set and A.C. reset line, the trigger 412 will turn ON and OFF on rises of the oscillator output, as indicated by the waveform 414 in FIG. 12, and the trigger 410 will turn ON and OFF in response to the fall in oscillator potential as indicated by the waveform 416 in FIG. 12. The formation of the pulses A–D is accomplished by mixing the outputs of the two triggers. Specifically, the "1" output (or ON output) of trigger 410 on line 418 is utilized to gate an AND circuit 420 to form an A-pulse on a line 422 and is also utilized in an AND circuit 424 to form a B-pulse on a line 426. The A-pulse is generated at a time when the trigger 412 is OFF due to the "0" or OFF line 428 applied to the AND circuit 420. The B-pulse is generated during the time that both triggers are ON due to the application of the ON or "1" line 430 of the trigger 412 to the AND circuit 424. A C-pulse is generated on a line 432 in response to an AND circuit 434 which is gated by the "1" or ON line 430 of trigger 412 and the "0" or OFF line 436 of trigger 410. The D-pulse is formed on a line 440 in response to both the "0" or OFF lines 428, 436 which gate a corresponding AND circuit 442. Thus, as evidenced by the waveforms 444–447 in FIG. 12, the A-, B-, C-, and D-pulses are cyclicly generated in respective sequence.

Control circuit

FIG. 13 (Sheet 9) shows the details of the control circuit 160. In the description of these circuits, frequent reference to FIG. 2a, and to FIGS 3–5, will orient the details of operation of the control 160 to the over-all operation of the machine. The INITIATE, MODULAR COUNT, ADJUST and ROW END cycles on lines 162, 164, 166, and 168, respectively, are generated by respectively corresponding triggers 450–453. The INITIATE trigger 450 is set by a line 454. This is energized by a gate 455 which is enabled by an AND circuit 456 and which is operated by the rising output of an inverter 457 at the end of D-time, provided that no signal is present on a line 458 from an inverter 460 in response to a STOP signal on a line 169. In other words, the AND circuit 456 can provide an output whenever the STOP signal is *not* present, and is prevented from gating the gate 455 whenever the STOP signal *is* present on line 169. The other input to the AND circuit on line 462 is the output of an OR circuit 464. The OR circuit 464 can provide an output in response to a MANUAL START signal on line 165, a machine start signal on the line 167, or in response to the ROW END cycle on line 168. The fourth input to the OR circuit 464 is a line 466 which comprises the output of an AND circuit 468. The AND circuit 468 will be blocked by a MATRIX COUNTER OVERFLOW on line 252 after inversion by an inverted 470. A second input to the AND circuit 468 is the ADJUST cycle on line 166. Thus the AND circuit 468 will have an output during an ADJUST cycle when the MATRIX COUNTER has not overflowed. The INITIATE cycle trigger 450 is reset automatically at D-time of each INITIATE cycle by a gate circuit 471. The ADJUST cycle line 166, the MODULAR ACCUMULATOR OVERFLOW line 144, and the MATRIX COUNTER OVERFLOW line 252 are each applied to an AND circuit 472 to provide a level to a gate 473 which generates a SET ROW END signal on a line 474 in response to the leading edge of the output of an inverter 475 at the end of D-time. The output of the gate 473 turns on the ROW END cycle trigger 453.

Referring briefly to the top of FIG. 3, the objective of setting the INITIATE cycle trigger is achieved initially by either manual start or machine start gating the AND circuit 456 (FIG. 13) to set the INITIATE cycle. Then, as shown in the upper part of FIG. 5, the INITIATE cycle can also be set at the end of any ADJUST cycle in which the MATRIX COUNTER has not overflowed. In the event that the MATRIX COUNTER has overflowed, then, instead of setting the INITIATE cycle, the ROW END cycle is set. Whenever the ROW END cycle is set it automatically gates the AND circuit 456 (FIG. 13) at the next D-time to thereafter set the INITIATE cycle. Thus, there are two ways to initially set the INITIATE cycle (manual and machine start); one way to set it during an ADJUST cycle; and one way to set it during a ROW END cycle.

The MODULAR COUNT cycle trigger 451 is automatically set during each INITIATE cycle as a result of a gate circuit 476 which provides an A.C. set signal on a line 478 in response to a rising signal output from an inverter 477 at the end of D-time. The ADJUST cycle trigger 452 is set at the end of D-time of a MODULAR COUNT cycle wherein modular counting has ended as indicated by a signal on the line 184. This is effected by an AND circuit 480 which provides a gating signal to a gate 479, the gate responding to a rising signal from an inverter 481 at the end of D-time. The AND circuit 480 is also dependent on the output of the FIRST AND LAST MODULAR COUNT trigger 486 which is on until the first D-time of a MODULAR COUNT cycle, and is then off until the first D-time in which MODULAR COUNTING has ended. This prevents a race between circuits whenever the modular count reaches ZERO as a result of being advanced at D-time, since it causes the AND circuit 480 to be blocked until after that D-time. Thus, the MODULAR COUNT trigger is reset at D-time of a MODULAR COUNT cycle following the cycle within which modular counting ends. The gate circuit 479 provides the A.C. reset signal on line 482 for the MODULAR COUNT cycle trigger 451, which also sets the ADJUST cycle trigger 452. Thus the ADJUST cycle is in the process of being set at the same time that the MODULAR COUNT cycle is in the process of being reset. The FIRST AND LAST MODULAR COUNT trigger 486 is set by an AND circuit 487 at the start of A-time in a MODULAR COUNT cycle whenever the circuit is enabled by the output of an inverter 488 which will occur after modular counting has ended. The trigger 486 is reset by an AND circuit 489 during the first D-time of each MODULAR COUNT cycle. Thus, at the start of any MODULAR COUNT cycle, the FIRST AND LAST MODULAR COUNT trigger 486 will be on, and it will be turned off at the first D-time of that MODULAR COUNT cycle. The trigger will then remain off until after modular counting has ended, and will be turned on at the A-time of a MODULAR COUNT cycle immediately following any MODULAR COUNT cycle within which modular counting has ended. Thus the trigger is on through the first part of a FIRST MODULAR COUNT cycle, and through the last part of a final MODULAR COUNT cycle, and is off during any in-between MODULAR COUNT cycles. Additional uses and reasons for this trigger are explained more fully hereinafter.

The ADJUST cycle trigger 452 and the ROW END cycle trigger 453 are each reset by the line 454 whenever the INITIATE cycle trigger is set. This means that the ADJUST cycle trigger will remain on during a ROW END cycle, and will be turned off at the start of an INITIATE cycle whether there is a ROW END cycle or not. This is the factor that maintains the ADJUST cycle functions during each ROW END cycle, so as to provide print out of the remaining portion of a character which may be stored in the OVERFLOW REGISTER at the end of printing in the forty-eighth matrix position, as described hereinbefore. Note that the line 454 that sets the INITIATE cycle trigger 450 also comprises the line 161 which calls the next character and, as indicated at the top of FIG. 13, the line 161 also may provide a LINE ADVANCE signal to a paper feeding mechanism to advance the position of paper as may be necessary in association with any specific embodiment of this invention. The line 454 also comprises the RESET OVERFLOW TRIGGERS line 163. Furthermore, whenever an INITIATE cycle is set by the line 454, if the ROW COUNTER has overflowed as indicated by a signal on the line 266, an AND circuit 484 will provide the SKIP signal on line 262 to cause three rows of paper to be provided between adjacent lines of characters.

CHARACTER REGISTER

FIG. 14 (Sheet 10) is a schematic block diagram of the CHARACTER REGISTER which stores bits 1–5 received over a trunk of five lines 122 from the buffer storage 304 shown in FIG. 2b. Each of the lines 122 is fed to an AND circuit 500 where it is gated with a SET line 502 from an AND circuit 504 during an INITIATE cycle at B-time. The outputs 506 of each of the AND circuits 500 comprise set inputs to respectively corresponding latches 508. Each of the latches 508 may be reset by a RESET signal on a line 510 from an AND circuit 512 at A-time of each INITIATE cycle. Thus all of the latches 508 are initially reset, and are then selectively set in accordance with the character code bit designated by the respectively corresponding line 122. The output of each latch 508 on a respectively corresponding pair of the trunk of ten lines 172 provide both the true and the complement of the input signals on respectively corresponding lines 122. For instance, if there is no 5-bit signal on the line 122–5, the latch 508–5 will remain reset, and there will be no signal on the line 172–5 but there will be a signal on the line 172–5̄. Of course, the latches 508 will remain set until A-time of the following INITIATE cycle at which time they are reset in preparation for receiving the code of a subsequent character.

CHARACTER DECODE

FIG. 15 (Sheet 11) is a schematic block diagram of an exemplary character decode circuit. The CHARACTER DECODE 174 receives code bits over the trunk of ten lines 172 from the CHARACTER REGISTER 170 (shown in FIG. 14). The CHARACTER DECODE circuit 174 has as its sole object the energization of a unique one of thirty-two possible output lines 176 to designate the character represented by a combination of five bits at the input to the decode circuitry. Although the manner of decoding is straightforward, and although it has nothing whatsoever to do with a binary number system, nonetheless the organization of AND circuits which performs the decoding is easily understood when considered with respect to a five-bit binary code which the character decode input on lines 172 could be considered as representing. Specifically, the 1-bit on the line 172 could be considered the lowest order binary bit position. As shown in FIG. 14, this may be represented XXXX1 or XXXX0, alternatively. Similarly, the line 172–5 could represent the highest order of the five binary bit positions and thus contribute to numbers of the form 1XXXX and the line 172–5̄ could contribute to numbers of the form 0XXXX. Thus, in FIG. 15, the AND circuit 520 at the top of FIG. 15 is responsive to the 1̄-bit and the 2̄-bit lines and therefore controls those lines which may represent numbers in the form of XXX00. Similarly, the AND circuit 522 contributes to numbers of the form XXX01, the AND circuit 524 contributes to numbers of the form XXX10, and the AND circuit 526 contributes to numbers of the form XXX11. The AND circuit 528 contributes to numbers of the form 000XX, the AND circuit 530 contributes to numbers of the form 001XX, and the AND circuit 542 contributes to numbers of the form 111XX. The AND circuits 532, 534, 536, 538 and 540 each contribute in a similar fashion. The remaining AND circuits 546 each combine the output of the previously mentioned AND circuits in an obvious manner so as to generate character-representing signals, the equivalent binary value of which are shown at the respectively corresponding ones of the thirty-two output lines 176. Thus, any combination of five bits will generate one of the characters shown at the right side of FIG. 15. It should be obvious to any one skilled in the art that different characters, more code bits and additional characters and/or lower-case characters or numerals could be used as desired.

PRINT DECODE

FIG. 16 (Sheet 12) is a schematicized diagram of the PRINT DECODE 126 which comprises a magnetic core matrix for decoding the characters one row at a time in a matrical fashion so as to provide dot by dot, row by row information for directly controlling the printing of characters. A plurality of magnetic cores 560 are arranged in a matrix of seven rows and nine columns. Each of the rows corresponds to one of the rows of dots which are printed in composing a line of characters. Each of the columns corresponds to one of the possible dot positions in a matrix position wherein printing could be effected. There need only be nine columns because every character has at least one non-printed space at the right-hand side thereof, and therefore the tenth position is always a "no-print" position. Recalling that the CHARACTER REGISTER 170 is set at B-time of the INITIATE cycle, and that the CHARACTER DECODE circuit 174 is not gated, the character bits from the CHARACTER DECODE circuit will be available at the input to the PRINT DECODE before C-time in an INITIATE cycle. Therefore, one of the set of gated write amplifiers (W) 562 will have an input on its respectively corresponding one of the character bit lines 176 prior to C-time of an INITIATE cycle. When a gating signal is applied on a line 564 by an AND circuit 566 at C-time of the INITIATE cycle, it will drive one winding, for instance winding 568 which corresponds to the letter "W," in order to contribute half-current for resetting the square loop cores in a well-known manner. The winding 568 may be terminated in any suitable manner at a terminal point 569. The line 564 will also cause each of a plurality of ungated write amplifiers (W) 570 to provide drive current on respectively corresponding row drive windings 572 so as to set all the cores which correspond to dot positions of the particular character being stored. The row windings may be terminated at a point 573. It can be seen that each of the cores 560 which is in a position corresponding to one of the dots utilized in composing the character "W" is threaded by the drive winding 568 and by each of the row write drive windings 572. Thus, the character is stored in the print decode matrix at C-time of the INITIATE cycle.

Recalling that the correct one of the row bits on the trunk of seven lines 182 is available within any printing operation, it is seen that one of a plurality of gated read driver amplifiers (R) 574 will have an input in response to corresponding ones of the row bit lines 182 throughout printing operation. Therefore, at D-time in the MODULAR COUNT cycle, an AND circuit 576 will supply a DECODE signal on a line 578 to cause the proper one of a plurality of row read drive windings 580 to be energized, thereby driving out the information stored in the correct row. In the example given with respect to FIG. 1 of the subject embodiment, the second row would be energized and therefore the left-most and right-most cores of the second row would provide first and ninth dot bits on corresponding ones of a plurality of sense windings 582. Each of the sense windings 582 is applied to a corresponding one of a plurality of sense amplifiers 584, the outputs of which comprise the respective DOT BIT lines in the trunk of ten lines 151.

In summation, the print decode matrix receives an entire character each time that one of the rows of that character is to be printed, and only the correct row of the stored character is read out of the matrix for each printing operation.

WIDTH DECODE

FIG. 17 (Sheet 6) shows the WIDTH DECODE circuitry 128 which converts the character signals on the trunk of 32 lines 176 into a signal on one of the four possible CHARACTER WIDTH BIT lines in the trunk of four lines 180. An OR circuit 600 generates a four-dot wide character width bit, an OR circuit 602 generates a six-dot character width bit, an OR circuit 604 generates an eight-dot wide character width bit and an OR circuit 608 generates a ten-dot wide character width bit, all in an obvious manner which will not be described further.

MODULAR COUNTER

FIG. 18 (Sheet 13) shows the MODULAR COUNTER 130 and consists primarily of three triggers 610, 611 and 612 which can count in binary form from zero through seven. As connected in FIG. 18, however, the triggers 610–612 are set to represent a number between two and five in binary notation, and then the circuit is stepped so as to count downwardly from the original setting back to zero. The only function of the MODULAR COUNTER is to keep track of how many times the MODULAR ACCUMULATOR is advanced, so that the MODULAR ACCUMULATOR will accumulate an additional number of bits equal to the width of a character being loaded into it. This is accomplished by an AND circuit 613a which generates the END MODULAR COUNTING signal on line 184 when all of triggers 610–612 are OFF. The MODULAR COUNTER is considered to step from ten, to eight, to six, to four, to two, and then a zero, since these are the increments of width which are possible in any of the printed characters. For instance, a character must be either four, six, eight or ten bits wide, thus all characters are formed in increments of two dot widths. The A.C. set lead of each of the triggers 610–612 is energized by corresponding OR circuits 613–615 which respond to respectively corresponding setting lines 616–618, to which signals are delivered by related OR circuits 619–621. The OR circuits 613–615 are also responsive to respective advancing signals on corresponding lines 622. The line 622 comprises the ADVANCE line for the modular counter, and this line derives signals from an AND circuit 630 which, unless blocked by an inverter 632 as a result of an END MODULAR COUNTING signal on line 184, will pass pulses on a line 634 from an AND circuit 636 at B- and D-time of each MODULAR COUNT cycle.

Figure 18A:
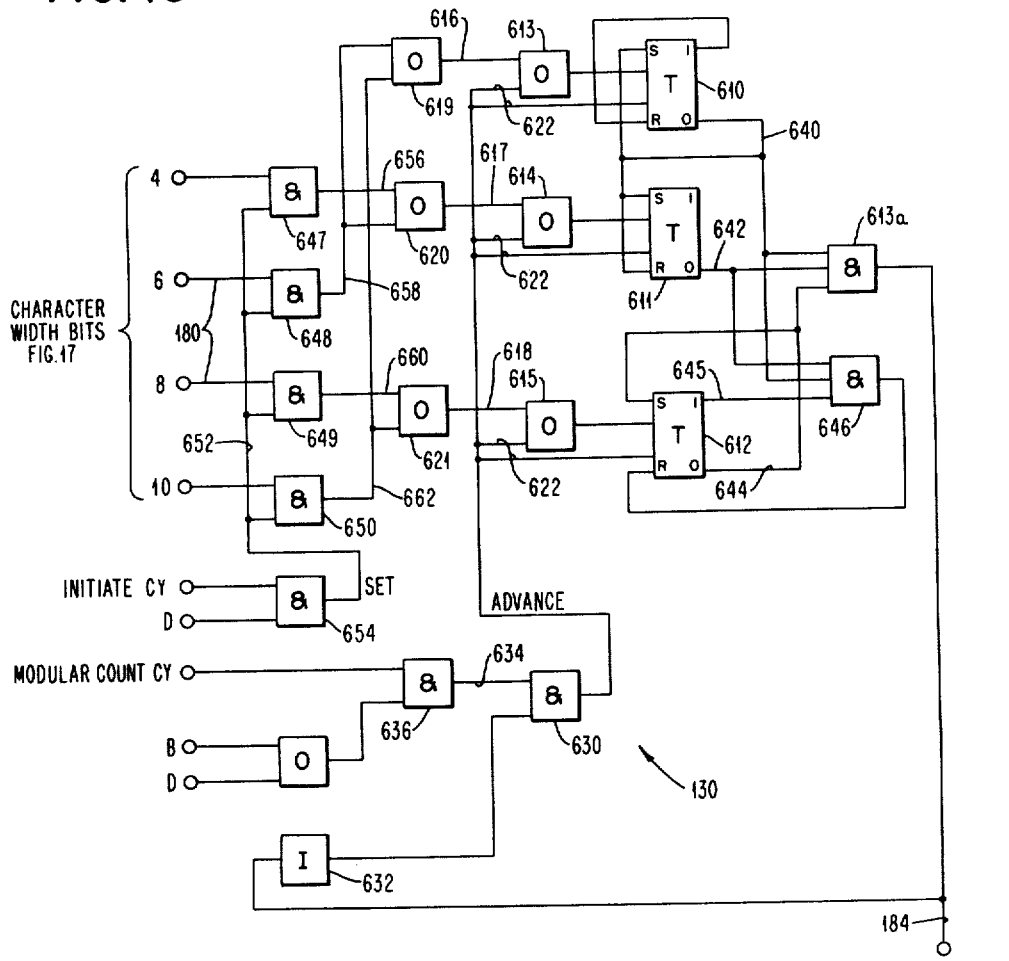
FIG. 18a is a chart illustrating the code of operation of the modular counter shown in FIG. 18.
Figure 19A:
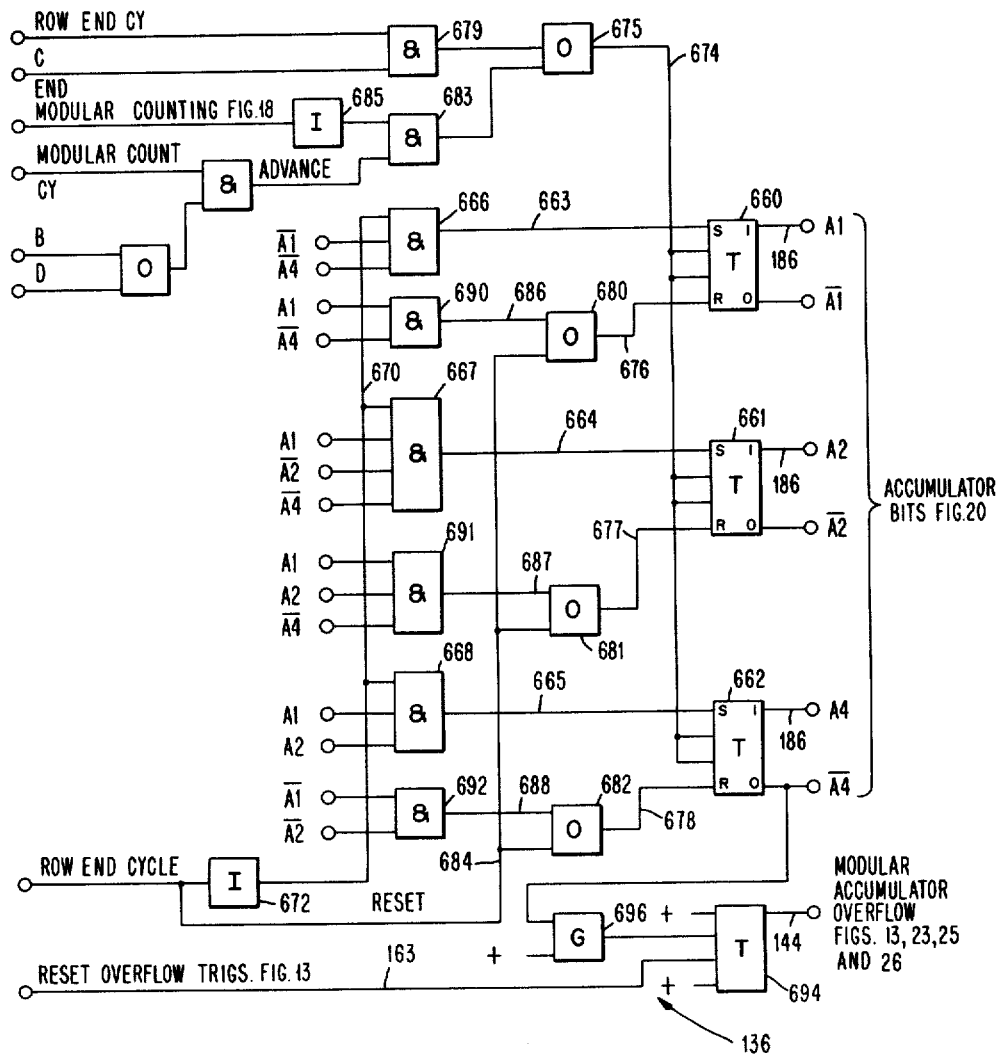
FIG. 19a is a chart illustrating the code of operation of the modular accumulator shown in FIG. 19.

Each signal on the advance line 622 will alternatively set or reset the trigger 610. The trigger 611, however, will be turned ON or OFF by the line 622 only when the "0" output of the trigger 610 on a line 640 is also available at the set and reset gate inputs of the trigger 611. Similarly, the trigger 612 will be turned OFF by the signal on line 622 only when the "1" output of the trigger 612 on a line 645, the "0" output of trigger 611 on line 642 and the "0" output of trigger 610 on line 640 are all available to an AND circuit 646. This arrangement is necessary so that stepping of the circuit from ten to zero as indicated in the chart of FIG. 18a will occur in proper sequence. For instance, the trigger 610 is ON for a width value of ten, OFF for eight, ON for six, OFF for four, etc. However, the trigger 611 is initially OFF for widths of ten and eight, but when trigger 610 is initially OFF and turned ON so as to achieve the proper setting for the width value of six, then the trigger 611 is turned ON. Similarly, when the trigger 610 is initially OFF and turned ON, so as to achieve the proper setting for the width value of two, the trigger 611 is turned OFF. Therefore, the trigger 611 is turned ON or OFF, alternatively, whenever the trigger 610 is turned ON. Similarly, the trigger 612 is turned OFF only when both triggers 610 and 611 are turned ON simultaneously; this is at a time when the triggers are being set to the proper condition to represent the width value of six. Thus, the advance line 622, together with the AND circuit 646, causes the triggers to step properly to achieve the results shown in FIG. 18a. Since each modulator count ends with all of the triggers OFF, a modular count may begin merely by setting those triggers which should be ON, without resetting those triggers which must be left OFF. This is achieved in a straightforward manner in conjunction with the OR circuits 619–621 by a plurality of AND circuits 647–650. Each of these AND circuits will gate one of the CHARACTER WIDTH BIT lines 180 in response to a SET signal on a line 652 which is generated by an AND circuit 654 at each D-time of an INITIATE cycle. In order to set a four, the AND circuit 647 provides a signal on a line 656 to the OR circuit 620 which will turn ON the trigger 611, leaving the triggers 610, 612 turned OFF. To set a six, the AND circuit 648 will send a signal over a line 658 to the OR circuit 620 and to the OR circuit 619. Thus a six will cause the triggers 610 and 611 to be turned ON. In setting an eight, the AND circuit 649 generates a signal on a line 660 which passes through the OR circuit 621, the OR circuit 615 and sets the trigger 612, leaving the triggers 610, 611 OFF. A ten will cause a signal on a line 662 to the OR circuit 621 and the OR circuit 619 thus setting triggers 610 and 612 ON and leaving trigger 611 OFF. Reference to FIG. 18a will illustrate the setting operation just described. It should be noted that the OR circuits 613–615 are provided so that the triggers may be turned ON either in the initial setting of the width value of a character, or may be turned ON as necessary to provide the stepping from ten to zero as indicated in FIG. 18a in response to the ADVANCE signal on line 622. Instead of using the OR circuits 613–615, it would be possible to connect either the setting or the advance function to the "1" output circuit of the trigger so that the trigger would be "pulled-over" into the ON condition. All of this is within the skill of the electronics art, and is not critical to the invention here being described. Furthermore, any other circuit capable of being set to a value and then stepped to zero could be utilized in place of the modular counter shown in FIG. 18.

MODULAR ACCUMULATOR

FIG. 19 (Sheet 14) is a diagram of the MODULAR ACCUMULATOR 136 which accumulates the total width values of all the characters printed in a row as printing proceeds character by character. The MODULAR ACCUMULATOR is also a three-bit binary counter, the essential elements of which are three triggers, 660–662. Each of the triggers 660-662 is gated, so that it can be turned ON, by a corresponding set gate line 663–665 in response to respective AND circuits 666–668. Each of the AND circuits 666–668 is gated by a signal on a line 670 which is generated by an inverter 672 at all times except during a ROW END cycle; in each ROW END cycle, the AND circuits 666–668 are blocked.

The triggers 660–662 are gated for reset by respective reset gate signals on lines 676–678 in response to related OR circuits 680–682. The OR circuits 680–682 will pass a RESET gate signal on a line 684 during a ROW END cycle and will pass corresponding signals on lines 686–688 from corresponding AND circuits 690–692.

The other inputs to the AND circuits 666–668 and 690–692 are the ACCUMULATOR BITS (outputs A1–A4, and their complements, from the triggers 660–662). These inputs cause the triggers to be set and reset as necessary to advance counting from zero through even width values to eight, and back to zero as indicated in the chart shown in FIG. 19a. For instance, in stepping from a width value of six to the width value of eight, the AND circuit 666 is blocked by the absence of the $\overline{A1}$ signal output from trigger 660 (since trigger 660 is ON and therefore is generating an A1 signal and is not generating an $\overline{A1}$ signal). But, the AND circuit 690 is gated by the A1 and the $\overline{A4}$ signal outputs. Therefore, trigger 660 will turn OFF if a setting signal appears on line 674. Similarly, the AND circuit 667 is blocked by the $\overline{A2}$ signal output from trigger 661, whereas the AND circuit 691 is gated by the A1, A2 and $\overline{A4}$ signals so that trigger 661 can be turned OFF also. On the other hand, AND circuit 668 will be gated by the A1 and A2 signals, whereas AND circuit 692 will be blocked by the absence of the $\overline{A1}$ and the $\overline{A2}$ signals so that trigger 662 can be turned ON. Similarly, any other shift shown in the chart of FIG. 19a can be achieved with the circuitry of FIG. 19.

The setting signal on line 674 is generated by an OR circuit 675 at C-time of a ROW END cycle due to an output from an AND circuit 679. This is used to reset the MODULAR ACCUMULATOR in the ROW END cycle, with the assistance of a reset gate signal to the OR circuits 676–678 by a line 684. Thus the line 684 enables the reset gates of the triggers while the line 670 blocks the AND circuits 666–668, and therefore blocks the set gates of the triggers, during each ROW END cycle.

The advancing of the MODULAR ACCUMULATOR is controlled by an AND circuit 683 which will, until blocked by an inverter 685 in response to the end of modular counting, pass the ADVANCE signal from an AND circuit 687 at each B-time and D-time of a MODULAR COUNT cycle.

The function of the MODULAR ACCUMULATOR is to designate the position wherein printing is to take place and to provide a MODULAR ACCUMULATOR OVERFLOW signal on line 144. The latter function is achieved by a trigger 694 which is turned ON by a GATE 696. There will be an output from the GATE 696 only during the transition which accompanies the change in trigger 662 for ON to OFF. Thereafter, the overflow designation will be maintained until it is reset by the RESET OVERFLOW TRIGGERS signal on line 163. The RESET OVERFLOW TRIGGERS signal on line 163 is generated (in FIG. 13) during D-time of a starting operation, or during D-time of an ADJUST or a ROW END cycle. Therefore, the MODULAR ACCUMULATOR OVERFLOW trigger 694 will be reset following each printing operation, so that the MODULAR ACCUMULATOR can again count to eight and then reset itself to determine the position in which subsequent characters are to be printed within a matrix.

MODULAR COUNT REGISTER

FIG. 20 (Sheet 15) is a diagram of the MODULAR COUNT REGISTER 142. The MODULAR COUNT REGISTER stores the preceding setting of a MODULAR ACCUMULATOR for printing a subsequent character. Thus, while one character is causing the MODULAR ACCUMULATOR setting to be changed, the MODULAR COUNT REGISTER remembers the previous setting of the MODULAR ACCUMULATOR so as to print that character in the correct position. The MODULAR COUNT REGISTER consists essentially of three triggers, 700–702 which are reset by a RESET signal on a line 704 from an OR circuit 706 in response to either of two AND circuits 708, 710 at the first D-time of the MODULAR COUNT cycle or at C-time of a ROW END cycle, respectively, and are set thereafter. The triggers 700–702 are set by corresponding AND circuits 712–714 when gated by a SET signal on a line 716 at C-time of a MODULAR COUNT cycle, after modular counting has ended. The corresponding inputs to the AND circuits 712–714 are the related ACCUMULATOR BITS A1–A3 on the trunk of three lines 186. Thus the triggers 700–702 will be set in a respectively corresponding manner as are the triggers 660–662 (FIG. 19) at C-time of the MODULAR COUNT cycle after modular counting has ended. The inverter prevents resetting the triggers after modular counting has ended, so the triggers 700–702 will retain this setting until D-time of a subsequent MODULAR COUNT cycle or until a ROW END cycle occurs.

POSITION DECODE

FIG. 21 (Sheet 15) shows a plurality of AND circuits 720 which comprise a POSITION DECODE circuit 190. The AND circuits 720 combine the true and complement MODULAR COUNT BITS which are transferred to it over a trunk of six lines 188 from the MODULAR COUNT REGISTER 142 shown in FIG. 20. The inputs to the AND circuits 720 are arranged to provide the POSITION BITS P0–P8 on the trunk of five lines 192 by decoding the MODULAR COUNT BITS, using principles of binary arithmetic, in accordance with the chart of FIG. 19a.

REGISTER ADDRESS SELECTOR

FIG. 22 (Sheets 16, 17) is a block diagram of one form of REGISTER ADDRESS SELECTOR 150 suitable for use in this invention. The function of the REGISTER ADDRESS SELECTOR is to receive the DOT BITS from the print decode circuit 126 shown in FIG. 16 over the trunk of ten lines 151, and to shift these into the proper positions on the trunk of ten lines 217 and the trunk of eight lines 219 going to the PRINT REGISTER and the OVERFLOW REGISTER, respectively. Each of the DOT BITS "1"–"10" on the lines 151 is made available to a plurality of AND circuits; for instance, the 1-bit is simultaneously applied to the input of the AND circuits 801, 821, 841, 861, and 881. Thereafter, one group of AND circuits (example: the group comprising AND circuits 801, 802, 803 . . . 810) may be energized by a corresponding one of a plurality of gating lines 800, 820, 840, 860, 880 in response to a related one of the POSITION BITS on lines 192 (example: line 800 in response to POSITION BIT P0) to gate the DOT BITS to the correct one of the plurality of output trunk lines 217, 219 through respective OR circuits 893–900, 901–908 (example: to lines 217 through OR circuits 893–900).

In the example of FIG. 1, the 1-bit would be gated through AND circuit 861 and OR circuit 897 to the PR7 terminal of the DOT BITS for transmission to the seventh bit position of the PRINT REGISTER. The 9-bit would be gated through the AND circuit 869 and the OR circuit 905 to the OR5 terminal of the DOT BITS for transmission to the fifth bit position of the OVERFLOW REGISTER. Other combinations are gated in a similar, obvious manner.

The gating lines 800, 820, 840, 860 and 880 are energized by corresponding AND circuits 800a, 820a, 840a, 860a and 880a in response to POSITION BITS on the lines 192. The AND circuits are gated by a LOAD REGISTERS signal on a line 750 from an AND circuit 752. The AND circuit will be gated at C-time of the first MODULAR COUNT cycle, and will thereafter be blocked; the end of modular counting (via inverter 754) will prevent gating the AND circuit 752 during the last MODULAR COUNT cycle.

PRINT REGISTER

FIG. 23 (Sheet 7) is a block diagram of the PRINT REGISTER 110. The essential component of the PRINT REGISTER are a plurality of latches 920, 921 which store DOT BITS in preparation for printing. Each of the latches 920 may be set by a corresponding OR circuit 922 in response to either DOT BITS from the REGISTER ADDRESS SELECTOR on the trunk of ten lines 217, or DOT BITS from the OVERFLOW REGISTER on the trunk of eight lines 224. The latches 921 are set only in response to DOT BITS on the trunk of ten lines 217 from the REGISTER ADDRESS SELECTOR. Each of the latches 920, 921 is reset by a RESET line 923 whenever there is a MODULAR ACCUMULATOR OVERFLOW during B-time of an ADJUST cycle in response to an AND circuit 924. The output of each of the latches may be gated through a respectively corresponding one of a plurality of AND circuits 926 in response to a PRINT signal on a line 928 which is generated by an AND circuit 930 at each A-time of an ADJUST cycle whenever there is a MODULAR ACCUMULATOR OVERFLOW. Since the ADJUST cycle remains on during a ROW END cycle, printing will also be effected during A-time of a ROW END cycle. The output of the AND circuits 926 is supplied over a trunk of ten lines 235 to print mechanism 234 which may comprise magnetic printing elements 932 as shown in FIG. 23 or may comprise wire print operated by electrostatic clutches 934 as shown in FIG. 24, or any other form of matrix printer. The exact form of matrix printer is immaterial to this invention. In fact, one of the advantages of this invention is that it is adaptable for use with any form of matrix printer including magnetic and wire printers.

OVERFLOW REGISTER

FIG. 25 (Sheet 8) is a block diagram of the OVERFLOW REGISTER 112, which comprises essentially a plurality of latches 938 each of which may be set by DOT BIT signals on the trunk of eight lines 219. The latches 938 are reset by a RESET signal on a line 940 in response to an AND circuit 942, whenever there is a MODULAR ACCUMULATOR OVERFLOW, at D-time of an ADJUST cycle. The output of the latches 938 is passed through a plurality of AND circuits 944 to the trunk of eight lines 224 leading to the PRINT REGISTER in response to a TRANSFER signal on a line 946 provided by an AND circuit 948, whenever there is a MODULAR ACCUMULATOR OVERFLOW, during an ADJUST cycle at C-time. Thus, the latches 938 are set to store overflow DOT BITS, these are transferred to the PRINT REGISTER at C-time of an ADJUST cycle, and the latches 938 are thereafter reset again at D-time of an ADJUST cycle, whenever there has been a MODULAR ACCUMULATOR OVERFLOW.

MATRIX COUNTER

FIG. 26 (Sheet 10) is a block diagram of a matrix counter which comprises a plurality of triggers TM1–TM32 which are arranged to count from zero to forty-seven and then directly back to zero. The A.C. set and A.C. reset inputs to each of the triggers is connected to an ADVANCE line 950 which advances the setting of the matrix counter at A-time of each ADJUST cycle after a MODULAR ACCUMULATOR OVERFLOW. Thus, the MATRIX COUNTER keeps track of which matrix has been printed, and therefore provides a setting indicative of the matrix within which printing is next to be effected. The true and complement output of each of the triggers TM1–TM32 are selectively connected to the input sides of these triggers so as to provide the necessary counting. This causes the six triggers to count to forty-seven and then to step from forty-eight to zero in accordance with the principles of well-known binary arithmetic. For example, the trigger TM1 is turned ON whenever it is OFF and is turned OFF whenever it is ON. The trigger TM2 is turned ON or OFF depending upon it originally being OFF or ON, respectively, whenever trigger TM1 is ON. In a like manner, a plurality of AND circuits 952 provide for the turning ON and OFF of the triggers TM4–TM32 in response to conditions existing in all of the triggers so as to provide proper advancing of the counter in an obvious fashion. Whenever the counter steps from forty-seven to zero, the trigger TM32 will turn OFF, which means that there will be a rising signal on a line 954 indicating the fact that the counter is switching to zero. This is shaped by a gate circuit 956 so as to set a trigger 958 indicating that the matrix count has overflowed. The gate 956 also provides an OVERFLOW OF MATRIX COUNT signal on a line 960 which is a transitory signal utilized to advance the ROW COUNTER shown in FIG. 27. The output of the trigger 958 comprises the MATRIX COUNT OVERFLOW signal on line 252 which is the signal that designates that the end of the row has been reached, and provides for going into a ROW END cycle. The trigger 958 is reset by the RESET OVERFLOW TRIGGERS signal on line 163 during the D-time which provides for setting the INITIATE cycle (see FIGS. 2 and 3).

ROW COUNTER

FIG. 27 (Sheet 18) shows the ROW COUNTER which counts rows as printing progresses to compose an entire line of characters. The ROW COUNTER consists essentially of three triggers 962–964 which are arranged to count from zero to six and directly back to zero. Specifically, the A.C. set and A.C. reset inputs to each of the triggers 962–964 are energized by ADVANCE signals provided by the OVERFLOW of matrix count line 960. Whether each trigger will be set or reset is determined by the pattern of counting in accordance with well-known binary arithmetic as illustrated in the chart of FIG. 29. For example, the trigger 962 is turned ON whenever it is OFF and either trigger 963 or trigger 964 is OFF, under the control of an AND circuit 966 and an OR circuit 968. Similarly, trigger 962 will be turned OFF whenever it is ON, under control of an AND circuit 970, whenever either of the other triggers is OFF as determined by OR circuit 968. The other triggers 963, 964 are similarly controlled by AND circuits 972 and an OR circuit 974 in an obvious manner. Whenever the ROW COUNTER 148 steps from row seven to row one (that is, from binary value six to binary value zero), there will be a rise in signal on the *r̄4* line 976 which will be passed through a gate circuit 978 to comprise the ROW OVERFLOW SIGNAL on the line 266. The outputs of all of the triggers 962–964 are transmitted over a trunk of six lines 980 to the ROW DECODE circuit shown in FIG. 28.

ROW DECODE

FIG. 28 (Sheet 18) shows a block indicating the ROW DECODE circuit which comprises a well-known decoder capable of energizing one of the trunk of seven lines 182 in dependence upon the combination of input signals applied over the trunk of six lines 980. This circuit operates so as to energize the correct ROW BIT line in accordance with the chart shown in FIG. 29, utilizing well-known principles. Inasmuch as the ROW DECODE circuit comprises well-known circuitry nearly identical with the POSITION DECODE circuit 190 shown in FIG. 21, no further description is believed necessary.

Alternative matrix arrangement

The invention has been described in an embodiment which utilizes a single row of printing elements, the embodiment being equally descriptive of one in which each of the matrix positions 102 (FIG. 1) has a respectively corresponding print head, and one in which the matrix positions 102 are all printed, in sequence, by the same print head. However, it is possible to utilize this invention in apparatus having suitable equipment for printing an entire line of characters at one time, or an entire page (comprising many lines of characters) at a time. It should be obvious, that if printing of an entire line, or more, of characters is to be effected at one time, then the row counter is not necessary, and the PRINT DECODE circuit 126 would be operated so as to read out the entire matrix of dots for one character all at once, into a plurality of PRINT registers and OVERFLOW registers 110, 112. In this instance, it would be necessary to provide seven times as much apparatus for the REGISTER ADDRESS SELECTOR 150, and seven times as many storage positions in the PRINT REGISTER 110 and the OVERFLOW REGISTER 112.

Alternatively, the same amount of apparatus could be utilized for the REGISTER ADDRESS SELECTOR 150 and the PRINT and OVERFLOW registers 110, 112, utilizing this equipment serially with respect to each character—that is, the first row of a character would be printed followed by the second through the seventh rows of that character before stepping to the next character. This then would provide printing in one entire matrix position before proceeding with the next matrix position, but printing within each matrix position row by row in a serial fashion. However, to do this would require the row counter and would be merely a minor modification of the embodiment disclosed.

Therefore, if printing of an entire matrix position (seven rows of dots) at one time is desired, it can be seen that this is readily achieved by eliminating the ROW COUNTER and its functions, and merely duplicating the REGISTER ADDRESS SELECTOR 150 and PRINT and OVERFLOW registers 110, 112. Other obvious changes in the manner in which the characters are composed on the paper can readily be made.

Note that the only function which is inherently serial in nature is the accumulation of dot widths—that is, the widths of characters must be counted, starting from the left side of a row or line in seriatum.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In control apparatus for controlling a matrix printer of the type which has means for printing dots in rows according to configurations of characters so as to provide a line of printed characters, the control apparatus being provided with successive coded manifestations of characters to be printed in a sequence, a printer control comprising:

print coding means responsive to said coded manifestations for providing a print control manifestation of each character in accordance with the matrix-printed configuration of said character, said print coding means generating a manifestation of each character in accordance with a configuration of said character which includes a width of more or less dots in horizontal rows for wider and narrower characters, respectively;

width means responsive to said coded manifestations for designating and accumulating the dot width values of successive ones of said characters in said sequence, said width means allocating dot widths to said characters in accordance with the respective widths of manifestations provided by said print coding means;

and means responsive to said width means and said print coding means for causing the printing of said characters in response to manifestations from said print coding means, in sequence, at positions determined by said width means.

2. In control apparatus for controlling a matrix printer of the type which has means for printing dots in rows according to configurations of characters so as to provide a line of printed characters, the control apparatus being provided with successive coded manifestations of characters to be printed in a sequence, a printer control comprising:

print coding means responsive to said coded manifestations for providing a print control manifestation of each character in accordance with the matrix-printed configuration of said character, said print coding means generating a manifestation of each character in accordance with a configuration of said character which includes an intercharacter space of at least one dot width for association with each character encoded thereby, said manifestation also comprising either an even or an odd number of dots in horizontal rows, as necessary, so as to preserve the normal symmetry of said characters;

position control means responsive to said coded manifestations for designating and accumulating the dot width values of successive ones of said characters in said sequence, said position control means allocating dot widths to said characters in accordance with the respective widths of manifestations provided by said print coding means;

and means responsive to said position control means and said print coding means for causing the printing of said characters in response to manifestations from said print coding means, in sequence, at positions determined by said position control means.

3. In control apparatus for controlling a matrix printer of the type which has means for printing dots in rows according to configurations of characters so as to provide a line of printed characters, the control apparatus being provided with successive coded manifestations of characters to be printed in a sequence, a printer control comprising:

a print coding means responsive to said coded manifestations for providing a print control manifestation of each character in accordance with the matrix-printed configuration of said character, said print coding means generating a manifestation of each character in accordance with a configuration of said characters which includes an intercharacter space of at least one dot width for association with each character encoded thereby, said manifestation also comprising either an even or an odd number of dots in horizontal rows, as necessary, so as to preserve the normal symmetry of said characters and further comprising a width of more or less dots in said horizontal rows for wider and narrower characters, respectively;

position control means responsive to said coded manifestations for designating and accumulating the dot width values of successive ones of said characters in said sequence, said position control means allocating dot widths to said characters in accordance with the respective widths of manifestations provided by said print coding means;

and means responsive to said position control means and said print coding means for causing the printing of said characters in response to manifestations from said print coding means, in sequence, at positions determined by said position control means.

4. In control apparatus for controlling a matrix printer of the type which has means for printing dots in rows according to configurations of characters so as to provide a line of printed characters, the rows of dots being subdivided into groups which may be called matrix positions, a proportional space control comprising:

character means for designating a plurality of characters to be printed in a line, said means providing manifestations of successive ones of said characters in sequence;

print coding means responsive to said character means for encoding manifestations from said character means into manifestations corresponding to variable width dot configurations of each respectively corresponding character;

width means responsive to said character means for designating, and providing a manifestation of, the number of dots included in the width of each character;

counting means responsive to said width means for providing a manifestation of the total width value of all the ones of said plurality of characters in said sequence, the dot rows of which have been printed;

and print effecting means responsive to said counting means to cause the printing of a one of said characters subsequent in sequence to ones of said characters for which printing has been effected, in a position within said line of characters determined by said counting means.

5. In control apparatus for controlling a matrix printer of the type which has means for printing dots in rows according to configurations of characters so as to provide a line of printed characters, the rows of dots being subdivided into groups which may be called matrix positions, a proportional space control comprising:

character means for designating a plurality of characters to be printed in a line, said means providing manifestations of successive ones of said characters in sequence;

print coding means for encoding manifestations from said character means into manifestations corresponding to the dot configuration of each respectively corresponding character;

width means for designating, and providing a manifestation of, the numbers of dots included in the width of each character;

accumulating means for counting the dot widths of each character in response to the manifestations from said width means and for providing a manifestation of the accumulated dot widths of all of said plurality of characters, said accumulating means having a dot width capacity equal to the dot width of each of said matrix positions, said accumulating means cyclicly counting to said capacity and returning directly to zero and providing an overflow designation upon each occurrence of counting through said capacity to zero;

count register means for storing the manifestations from said accumulating means;

print register means for storing manifestations from said print coding means, said print register means having a capacity greater than the dot width capacity of one of said matrix positions;

register addressing means responsive to said count register means for directing manifestations of a character from said print coding means to a position in said print register determined by the accumulation of all previously accumulated ones of said plurality of characters;

and print means responsive to said overflow designation to cause the printing of dots determined by the content of said print register means.

6. The device described in claim 5 wherein printing of a line of characters is accomplished one row of dots at a time, each row including dots from an entire line of characters, said device additionally comprising:

matrix count means responsive to said overflow designation for counting, and providing a manifestation of, the number of matrix positions within which a row of dots has been printed, said means counting to a value equal to the number of matrix positions included in a full line of characters and thereafter returning to zero and generating a matrix overflow designation;

row count means responsive to said matrix overflow designation for counting, and providing a manifestation of, the number of rows within which printing has been effected;

and means responsive to said matrix count means and said row count means for selecting the matrix within which printing is caused by said print means.

References Cited by the Examiner

UNITED STATES PATENTS

| | | | |
|---|---|---|---|
| 2,046,328 | 7/38 | Kleinschmidt et al. | 178—5 |
| 2,298,276 | 10/42 | Burcky et al. | 346—35 |
| 2,658,106 | 11/53 | Hell | 178—30 |
| 2,732,424 | 1/56 | Oliver | 178—5 |
| 2,893,810 | 7/59 | Miller et al. | 346—35 |
| 2,939,388 | 6/60 | Frogatt. | |
| 2,955,894 | 10/60 | Epstein. | |

OTHER REFERENCES

"Electronics," June 1957 issue, pages 182–185, article entitled "Digital Printer Boosts Readout Time." by H. W. Gettings.

WILLIAM B. PENN, *Primary Examiner.*

ROBERT A. LEIGHEY, *Examiner.*